(12) United States Patent
Nakamura

(10) Patent No.: US 8,379,268 B2
(45) Date of Patent: Feb. 19, 2013

(54) IMAGE ENLARGEMENT METHOD, IMAGE ENLARGEMENT APPARATUS, AND IMAGE FORMING APPARATUS

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 12/688,841

(22) Filed: Jan. 15, 2010

(65) Prior Publication Data

US 2010/0182623 A1 Jul. 22, 2010

(30) Foreign Application Priority Data

Jan. 21, 2009 (JP) ................................ 2009-011120

(51) Int. Cl.
*G06F 15/00* (2006.01)
*H04N 1/46* (2006.01)
*G06K 15/02* (2006.01)

(52) U.S. Cl. ........................... 358/1.9; 358/525; 358/1.2

(58) Field of Classification Search .................. 358/1.9, 358/525, 1.2; 382/299; 352/166; 348/E9.026, 348/E9.027; 345/589; 347/229
See application file for complete search history.

(56) References Cited

U.S. PATENT DOCUMENTS

| 5,243,440 | A | 9/1993 | Hashimoto |
| 6,311,328 | B1 | 10/2001 | Miyazaki et al. |
| 2006/0262179 | A1* | 11/2006 | Tan et al. ...................... 347/229 |

| 2007/0030452 | A1* | 2/2007 | Gilbert ........................ 352/166 |
| 2008/0019612 | A1 | 1/2008 | Koyanagi |
| 2011/0090239 | A1* | 4/2011 | Suzuki et al. ................. 345/589 |

FOREIGN PATENT DOCUMENTS

| JP | 4-362792 | | 12/1992 |
| JP | 9-326958 | | 12/1997 |
| JP | 2002-015327 | A | 1/2002 |
| JP | 2003-177669 | A | 6/2003 |
| JP | 2003-224715 | A | 8/2003 |
| JP | 2004-276475 | A | 10/2004 |
| JP | 2005-269502 | A | 9/2005 |
| JP | 2007-074516 | A | 3/2007 |
| JP | 2008-021126 | A | 1/2008 |

OTHER PUBLICATIONS

Japanese Office Action issued on Oct. 9, 2012, concerning Japanese Patent Application No. 2009-011120.

* cited by examiner

*Primary Examiner* — Charlotte M Baker
(74) *Attorney, Agent, or Firm* — Fitzpatrick, Cella, Harper & Scinto

(57) ABSTRACT

Virtual pixels not included in input image data are arranged before a first input pixel and after a last input pixel of an input pixel array, respectively. A position of a first output pixel is determined so that a difference between a position of the first input pixel and the position of the first output pixel equals a difference between a position of the last input pixel and a position of a last output pixel. Pixel data of an output pixel before the first input pixel is interpolated based on pixel data of the virtual pixel before the first input pixel and pixel data of the first input pixel. Pixel data of an output pixel after the last input pixel is interpolated based on pixel data of the virtual pixel arranged after the last input pixel and pixel data of the last input pixel.

9 Claims, 17 Drawing Sheets

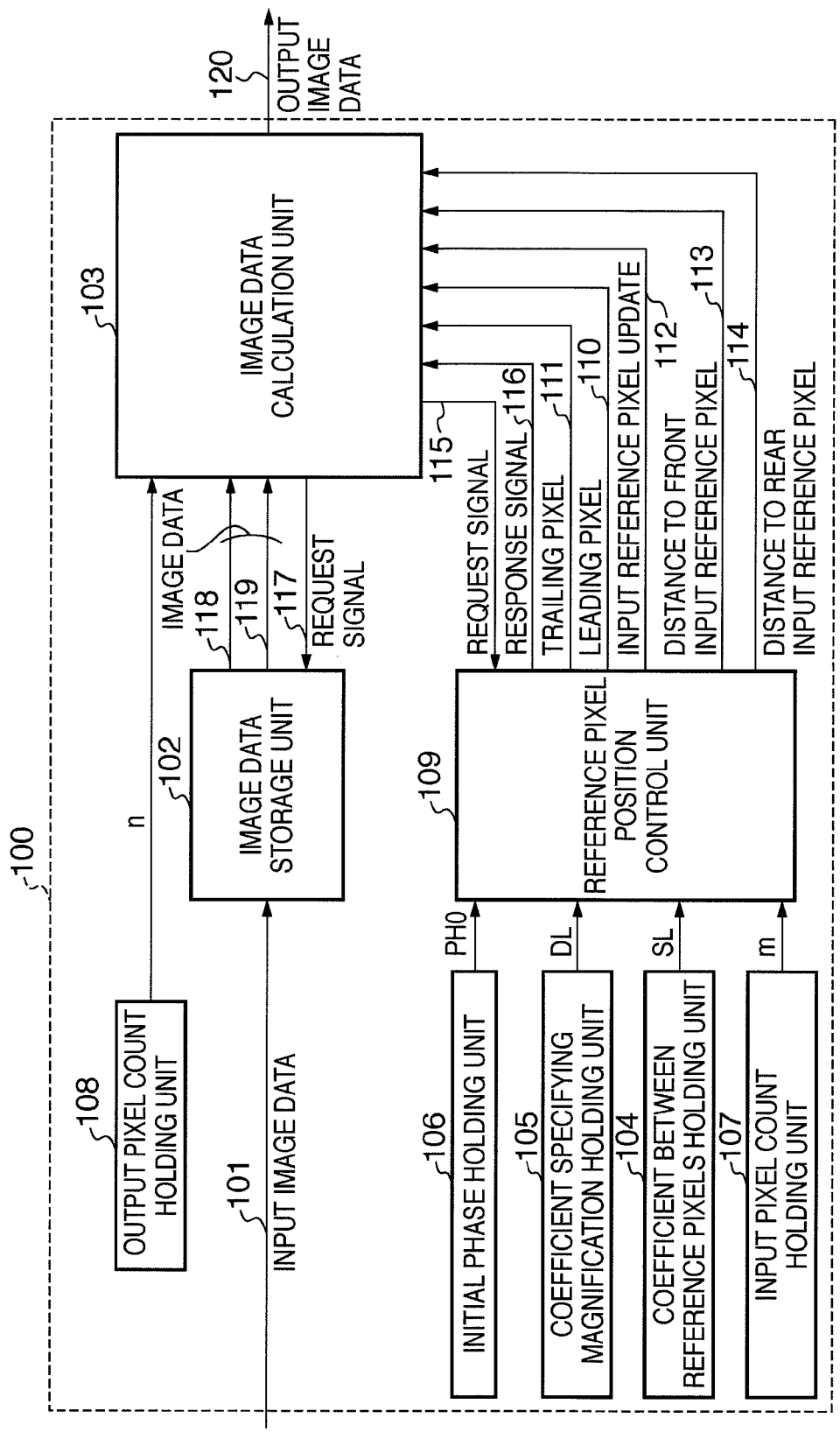

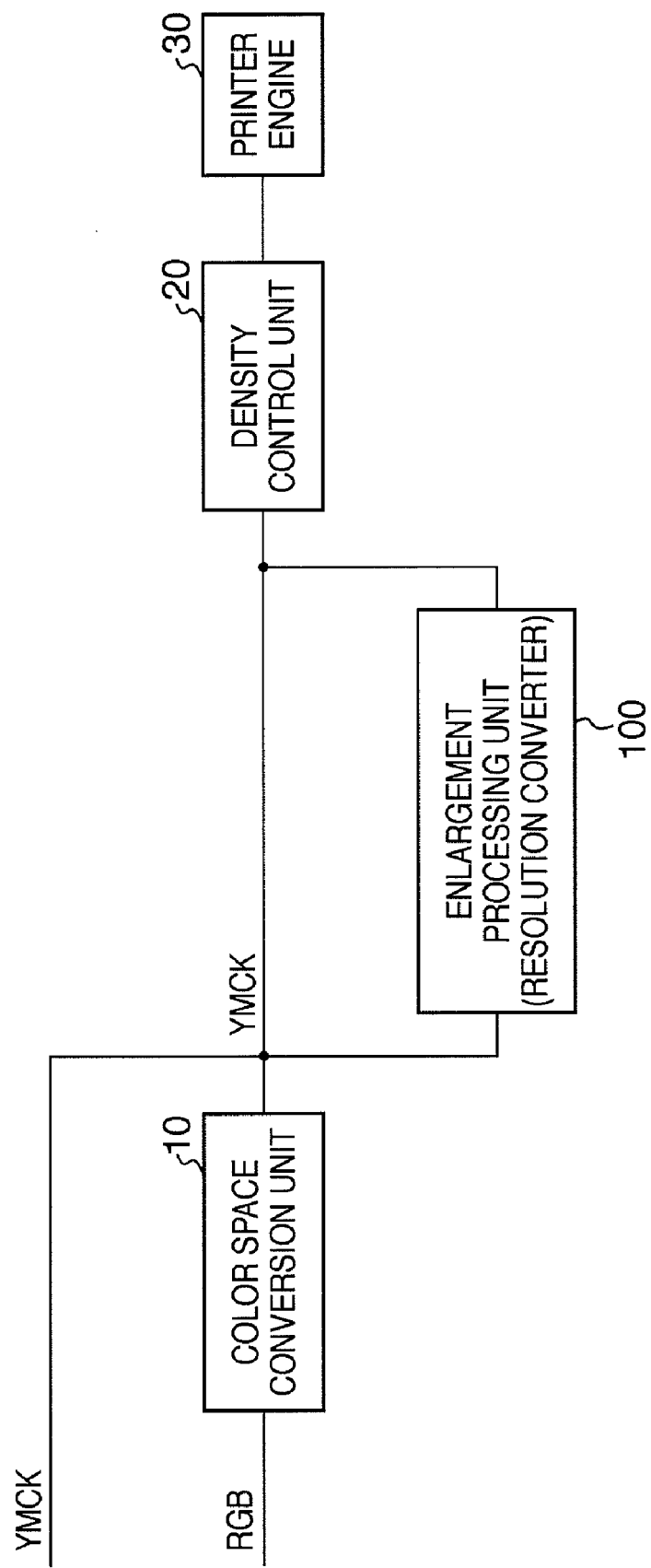

IMAGE ENLARGEMENT METHOD, IMAGE ENLARGEMENT APPARATUS, AND IMAGE FORMING APPARATUS

BACKGROUND OF THE INVENTION

1. Field of the Invention

The present invention relates to an image enlargement method, image enlargement apparatus, and image forming apparatus for performing enlargement processing by resolution conversion at an arbitrary magnification for digital image data input by a scanner device or image input device.

2. Description of the Related Arts

The chance to output images is rising along with the prevalence of image input devices for reading image data, such as a scanner device, and image sensing devices such as a digital camera. For example, it is becoming popular to output images by multifunction peripherals (to be referred to as MFPs) in the office and home. In particular, devices with an image sensing function for personal use, typified by a digital camera and cell phone, actively perform edition or output of image data using storage media such as an SD card.

The number of image sensing pixels of digital image data in these image sensing devices are increasing year by year. However, the total pixel count is not sufficient, compared to the print resolution of an image output device or the print medium size. In some cases, sensed image data is output in a large size. The demand has arisen for an enlargement processing function to output input image data at higher quality.

Image data enlargement methods include an SPC method, linear interpolation method (bi-linear method), and bi-cubic method. The SPC method and linear interpolation method implement an enlargement processing function by relatively simple configuration requirements. The bi-cubic method provides an enlargement processing function at high image quality though the configuration requirements are complex.

In enlargement processing by an image output device such as an MFP, the bi-cubic method enables enlargement processing at high image quality. However, the bi-cubic method is mounted mainly in high-level function products owing to high control complexity and a large circuit scale. Output from a digital camera and the like uses not only a high-level function MFP but also a home MFP. Most enlargement processing methods installed in such low-end MFPs are not the bi-cubic method in terms of the configuration requirements.

The SPC method and linear interpolation method will be explained with reference to the accompanying drawings.

(Concept of SPC Method)

The SPC method implements the enlargement function most easily. FIG. 18 shows the concept of one-dimensional enlargement processing by the SPC method.

In FIG. 18, pixels S0, S1, S2, and S3 represented by quadrangles form an input image. The density of the quadrangle indicates a pixel value. The black pixels S0 and S3 mean that these pixels are black (high density). The white pixels S1 and S2 mean that these pixels are white (low density). In the example of FIG. 18, the input image is made up of four pixels, and pixels at the two ends are black. SL represents the distance between constituent pixels of the input image.

When the input image data of four pixels is enlarged one-dimensionally at 2.5-magnification, the output pixel count is 10 (=4×2.5). Since output image data is formed by referring to input image data, a distance DL between constituent pixels of the output image is smaller than the distance SL between constituent pixels of the input image (DL<SL/2 because of 2.5-magnification enlargement). According to the SPC method, an input pixel value closest to an output pixel position is output as an output pixel. Hence, the first pixel S0 (black pixel) of the input image is output as the first pixel D0 and second pixel D1 of the output image. The second pixel S1 (white pixel) of the input image is output as the third pixel D2 and fourth pixel D3 of the output image. Similarly, the third pixel S2 of the input image is output as the fifth pixel D4, sixth pixel D5, and seventh pixel D6 of the output image. The fourth pixel S3 of the input image is output as the eighth pixel D7, ninth pixel D8, and 10th pixel D9.

The arrangement of enlargement processing by the SPC method is simple, but an image quality after enlargement processing is not high because the processing is simple as well. More specifically, simple duplication generates steps (stagger) in output image data, failing to implement smooth enlargement processing.

(Concept of Linear Interpolation Method)

The linear interpolation method is a method for solving the problems of the SPC method. In enlargement processing, two input pixel values closest to an output pixel position are referred to. The distance between a reference pixel and an output pixel position is calculated as a weighting coefficient.

FIG. 19 shows the concept of one-dimensional enlargement processing by the linear interpolation method. In FIG. 19 as well as FIG. 18, pixels S0, S1, S2, and S3 represented by quadrangles form an input image. As for a value (density) indicated by each input pixel, the black pixels S0 and S3 mean that these pixels are black (high density), and the white pixels S1 and S2 mean that these pixels are white (low density), similar to FIG. 18.

Also in FIG. 19, the input image is made up of four pixels, and pixels at the two ends are black. The distance between constituent pixels of the input image is SL.

When the input image data of four pixels is enlarged one-dimensionally at 2.5-magnification, the output pixel count is 10. Also in this case, output image data is formed by referring to input image data. Similar to FIG. 18, the distance DL between constituent pixels of the output image is smaller than the distance SL between constituent pixels of the input image (DL<SL/2 because of 2.5-magnification enlargement).

As the first pixel D0 of the output image, the first pixel S0 of the input image is output directly. The next pixel spaced apart by the distance DL between constituent pixels of the output image, that is, the second pixel D1 is obtained by calculation by referring to two input pixels S0 and S1 closest to the second pixel position.

The position of the second pixel D1 of the output image is spaced apart from the first pixel S0 of the input image by the distance DL. The position of the second pixel D1 of the output image is spaced apart from the second pixel S1 of the input image by a distance obtained by subtracting the distance DL between constituent pixels of the output image from the distance SL between constituent pixels of the input image. From this, the value of the second pixel D1 of the output image is given by equation (1) using the two input pixel values S0 and S1 close to the output pixel position, the distance DL to the second pixel position of the output image, and (SL−DL):

$$D1 = \{S0 \times (SL-DL) + S1 \times DL\}/SL \tag{1}$$

In equation (1), the reason for division by the distance SL between constituent pixels of the input image is that the distance to the output pixel position is calculated as a weight when calculating the D1 value. In many cases, the SL value is an exponent with a base of 2 to simplify the division circuit.

Subsequently, the value of the third pixel D2 of the output image is calculated. The third pixel position of the output image comes between the first pixel S0 and second pixel S1 of the input image, similar to the second pixel position of the output image. This is because the magnification of enlargement processing is 2.5 and the distance DL between constituent pixels of the output image is smaller than SL/2.

The position of the third pixel value D2 of the output image is spaced apart from the first pixel S0 of the input image by the distance DL further from the position of the second pixel value D1 of the output image, that is, by (DL×2). The position of the third pixel value D2 of the output image is spaced apart from the second pixel S1 of the input image by a distance obtained by subtracting (DL×2) from the distance SL between constituent pixels of the input image. That is, the value of the third pixel D2 of the output image is given using the two input pixel values S0 and S1 close to the output pixel position, the distance (DL×2) to the third pixel position, and (SL−DL×2):

$$D2=\{S0\times(SL-DL\times2)+S1\times DL\times2\}/SL \qquad (2)$$

Next, the value of the fourth pixel D3 of the output image is calculated. Unlike the preceding output pixel positions, the fourth pixel position of the output image comes between the second pixel S1 and third pixel S2 of the input image.

Shift of a reference pixel in the linear interpolation method is often determined by accumulating distances DL between pixels which form an output image. In the example of FIG. 19, distances DL between pixels which form an output image are accumulated. The timing when the sum exceeds SL is set as a timing to update the reference pixel position of an input image.

This will be explained using concrete numerical values. The distance SL between constituent pixels of an input image is assumed to be "256 ($2^8$)". In this case, the distance DL between constituent pixels of an output image in 2.5-magnification enlargement is attained by dividing SL by the magnification:

$$DL=SL/2.5 \qquad (3)$$

The fractional value of the calculation result in equation (3) is rounded down, obtaining a DL value "102". A target pixel position in the output image is three pixels after the first pixel output and is indicated by "306" as a result of accumulating DL three times. The accumulated DL exceeds SL ("256"), and the reference pixel position of the input image is updated to calculate an output image value.

When the distance SL between constituent pixels of an input image is represented by an exponentiation with a base of 2, for example, the carry of an accumulator triggers update of the reference pixel position of the input image in output pixel calculation. The output value of the accumulator after carry output can be used to calculate the distance to the output pixel position upon updating the reference pixel position of the input image. In the foregoing example, the distance from the reference pixel S1 of the input image to the fourth pixel position D3 of the output image is obtained by subtracting the distance SL ("256") between constituent pixels of the input image from the DL accumulated value "306". When the accumulator is configured by 8 bits defined as the distance SL, the output value of the accumulator after carry output is "50". Therefore, the distance from the reference pixel S2 of the input image to the fourth pixel position D3 of the output image is "206" obtained by subtracting "50" from the distance SL ("256") between constituent pixels of the input image.

In the same way, the reference pixel position of the input image is updated in accordance with the pixel position of the output image. Output image data is calculated using, as a weighting coefficient, the distance from the reference pixel position to the pixel position of the output image.

For example, Japanese Patent Laid-Open No. 9-326958 discloses control of the pixel position of an output image and the reference pixel position of an input image in the linear interpolation method. This Japanese Patent Laid-Open No. 9-326958 describes calculation of the distance (weight) of the output pixel position and memory address control for easily reading input reference pixel data used in calculation.

The linear interpolation method proposes several methods in terms of a trailing pixel. In the example shown FIG. 19, a virtual pixel DS0 is arranged next to the fourth pixel S3 which forms the input image. In this case, the values of the pixels D8 and D9 of the output image that use the virtual pixel DS0 as a reference pixel change depending on the virtual pixel value. More specifically, the virtual pixel DS0 is set to have the same value as the immediately preceding pixel value S3 or a fixed value (white/black). The values of the pixels D8 and D9 are attained by interpolation calculation referring to the virtual pixel value and the last pixel S3 of the input image. As another method, the last pixel S3 which forms the input image is directly output without calculating the trailing edge of the output image, that is, D9 and D8.

The linear interpolation method described with reference to FIG. 19 suffers the same problems as those of the SPC method when the enlargement magnification is 2 or 4. This arises from direct output of the first pixel S0 of the input image by using the first pixel D0 after enlargement processing as the reference point of the output image.

For example, when the enlargement magnification is 2, the distance SL between constituent pixels of an input image and the distance DL between constituent pixels of an output image satisfy the relation of DL=SL/2, as is apparent from the calculation result of equation (3). This means that the output image is in phase (distance is 0) with pixel data which forms the input image for every two pixel outputs of the output image. In other words, even if interpolation calculation is done using two input pixels close to an output pixel position as reference pixels in calculation of an output pixel value, an input pixel is directly generated as an output pixel for every two pixels.

As a method for avoiding this problem, an initial phase is set in the linear interpolation method. FIG. 20 is a conceptual view of a linear interpolation method which sets an initial phase. In FIG. 20, the same reference numerals as those in FIG. 18 or 19 have the same meanings.

A feature of linear interpolation shown in FIG. 20 is that an initial phase is set for the output position of the first pixel D0 of an output image in a direction (rightward in FIG. 20) in which an image is formed. The initial phase is "INIT" in FIG. 20.

As a feature of the linear interpolation method shown in FIG. 20, the first pixel position of the output image is out of phase with that of the input image. Since the initial phase value is set for the first pixel D0 of the output image, the first pixel S0 of the input image is not directly output.

When the initial phase "INIT" is set to "30", the first pixel value of the output image is calculated based on the set initial phase value ("30") and a value ("226") obtained by subtracting the initial phase value ("30") from the distance ("256") between constituent pixels of the input image. Since the first pixel value of the input image represents black ("0") and the second pixel value represents white ("255"), the first pixel D0 of the output image at the initial phase value is $$D0=\{0\times(256-30)+255\times30\}/256\approx29$$

The second pixel D1 of the output image is a pixel position obtained by adding the distance DL ("128") between constituent pixels of the output image to the first pixel D0:

$$D1=\{0\times(256-158)+255\times158\}/256\approx157$$

The third pixel D2 of the output image is a pixel position obtained by further adding the distance DL ("128") between constituent pixels of the output image to the second pixel D1. The third pixel D2 is a pixel position ("286") obtained by adding DL×2 (="256") to the initial phase ("30"). This pixel position based on accumulation exceeds the distance SL ("256") between constituent pixels of the input image. Thus, a carry occurs in the accumulator, and a value ("30") obtained by subtracting "256" is output as an accumulation result.

In the example of FIG. 20, the second pixel S1 and third pixel S2 of the input image have the same value (white), so output pixel values by the weighting calculation become equal to input pixel values. However, if successive pixel values of an input image differ from each other in an image to be enlarged, the weighting calculation can provide smooth output pixel values.

Also in the example of FIG. 20, the virtual pixel DS0 is assumed next to the last pixel S3 of the input image. The value of the virtual pixel DS0 affects the seventh pixel D6 and eighth pixel D7 of the output image.

Setting an initial phase can avoid the problem that the pixel value of an input image is directly output as that of an output image at a magnification setting of 2 or 4. Note that Japanese Patent Laid-Open No. 4-362792 discloses a linear interpolation method which sets an initial phase. In particular, this Japanese Patent Laid-Open No. 4-362792 describes improvement of the SPC method by setting an initial phase "0" at an equal magnification and superimposing the first pixel of an output image at a middle point between the first and second pixels of an input image at other magnification settings.

However, the conventional linear interpolation method executes enlargement processing for the first pixel position of an output image in a direction in which image data are formed using the first pixel position of an input image as a reference. The first pixel position of the output image is in or out of phase with the first pixel position of the input image in the direction (between the first and second pixel positions of the input image) in which image data are formed. Resultantly, the whole image data after enlargement processing is rasterized with an offset in the direction (rightward) in which image data are formed.

That is, in all the examples shown in FIGS. 18, 19, and 20, input image data is horizontally symmetrical and only one pixel at each end is black pixel data. In contrast, output image data after enlargement processing is horizontally asymmetrical pixel data.

More specifically, in FIG. 18, black pixel data of two pixels are generated at the left end of output image data, and those of three pixels are generated at the right end. In FIG. 19, three pixels at the left end of output image data are not a little affected by the first pixel data (black) of the input image, and four pixels at the right end are affected by the fourth pixel data (black) of the input image.

This trend becomes more serious when the initial phase is set. In FIG. 20, pixel data of the output image affected by a black pixel in input image data are two pixels at the left end and four pixels at the right end. The conventional linear interpolation methods shown in FIGS. 18, 19, and 20 cannot achieve enlargement processing while keeping the symmetry of input image data.

Problems of the linear interpolation method are not limited to horizontal asymmetry. FIGS. 21A to 21C show problems generated in two-dimensional image data. FIG. 21A shows input image data before performing enlargement processing. The input image data is formed from black pixels with a width of N pixels each at upper, lower, right, and left ends. When this input image data is enlarged at a magnification P, the black pixel width should be a pixel width of N pixels×magnification P at all the ends even in output image data as long as horizontal and vertical symmetries are maintained.

However, when no initial phase is set in the linear interpolation method, output image data after enlargement have asymmetrical black pixel widths in the horizontal and vertical directions, as shown in FIG. 21B. In FIG. 21B, Xa is the left black pixel width of the output image data and Xb is the right black pixel width of the output image data. Ya is the upper black pixel width of the output image data and Yb is the lower black pixel width of the output image data.

As shown in FIG. 21B, black pixel widths Xa and Xb at the left and right ends are not equal in two-dimensional image data. Also, black pixel widths Ya and Yb at the upper and lower ends are not equal. Particularly when the number of constituent pixels of input image data in the lateral direction (to be referred to as a main scanning direction) differs from that of constituent pixels in the longitudinal direction (to be referred to as a sub-scanning direction), reproduced black pixel widths in the horizontal and vertical directions also differ from each other. That is, even Xa and Ya, and Xb and Yb are different from each other. This arises from a phase shift in the linear interpolation method owing to the difference between the main scanning direction and the sub-scanning direction in the count, determined by the magnification, at which distances DL between constituent pixels of an output image are accumulated. The reproduced black pixel width of the output image also changes depending on a set magnification.

When the initial phase is set in the linear interpolation method, the asymmetry of output image data after enlargement further worsens, as shown in FIG. 21C. This is because, when the initial phase is set and the first pixel position of an input image is set as a reference, the first pixel position of an output image shifts right (lower right for two-dimensional image data), compared to setting no initial phase. In this case, the difference between Xa and Xb and that between Ya and Yb become larger than those when setting no initial phase.

If a device for reading image data is capable of enlargement in the main scanning direction and sub-scanning direction, like a scanner device, extra data can be added to the left or upper side as input image data before enlargement processing by the linear interpolation method. In this case, the reference point can be shifted. However, no extra data can be added to input image data obtained by an image sensing device such as a digital camera. Within the device, modification such as addition of extra data corresponding to the magnification of enlargement processing is necessary using a medium holding input image data or another memory.

An increase in the number of processes leads to poor performance of the device regardless of hardware processing or software processing. When image data obtained by an image sensing device such as a digital camera has horizontal or vertical symmetry, the asymmetry of output image data having undergone enlargement processing by linear interpolation is more enhanced at a larger magnification.

The above description is based on an image forming apparatus. However, these problems also occur in enlargement (resolution conversion) by another image processing.

SUMMARY OF THE INVENTION

The present invention has been made to overcome the conventional drawbacks, and has as its object to provide an image enlargement method, image enlargement apparatus, and image forming apparatus capable of obtaining image data after enlargement (resolution conversion) by the linear interpolation method while keeping the symmetry of image data.

To solve the conventional problems, an image enlargement apparatus for enlarging an input image by performing interpolation on input image data according to the present invention, comprises: an arrangement unit configured to arrange virtual pixels, which are not included in the input image data, before a first pixel and after a last pixel in an input pixel array in at least one of horizontal and vertical directions of the input image to be enlarged; a determination unit configured to determine a position in an output image of a first pixel in an output pixel array of output image data in accordance with an enlargement magnification so that a difference between a position in the input image of a first pixel in the input pixel array and a position in the output image of the first pixel in the output pixel array equals a difference between a position in the input image of a last pixel in the input pixel array and a position in the output image of a last pixel in the output pixel array; and a calculation unit configured to calculate pixel data of an output pixel at a position in the output image before the position in the input image of the first pixel in the input pixel array by performing interpolation based on pixel data of the virtual pixel arranged before the first pixel in the input pixel array and pixel data of the first pixel in the input pixel array, and calculate pixel data of an output pixel at a position in the output image after the position in the input image of the last pixel in the input pixel array by performing interpolation based on pixel data of the virtual pixel arranged after the last pixel in the input pixel array and pixel data of the last pixel in the input pixel array.

The present invention can provide an image forming method and image forming apparatus capable of obtaining image data after enlargement (resolution conversion) by the linear interpolation method while keeping the symmetry of image data.

More specifically, the present invention enables input reference pixel control in the linear interpolation method that keeps the symmetry of image data before enlargement (resolution conversion). Even image data which does not allow modification of the number of constituent pixels of image data can provide enlarged (resolution-converted) image data which maintains the symmetry of image data to be enlarged (resolution-converted).

In addition, the present invention can implement enlargement (resolution conversion) processing which keeps the symmetry of image data independent of the magnification of enlargement (resolution conversion).

Further features of the present invention will become apparent from the following description of exemplary embodiments with reference to the attached drawings.

BRIEF DESCRIPTION OF THE DRAWINGS

FIG. 1A is a block diagram exemplifying the arrangement of an enlargement processing unit (resolution converter) in an embodiment;

FIG. 1B is a block diagram exemplifying the schematic arrangement of an image forming apparatus having the enlargement processing unit in the embodiment;

DETAILED DESCRIPTION OF THE EMBODIMENTS

Figure 2:
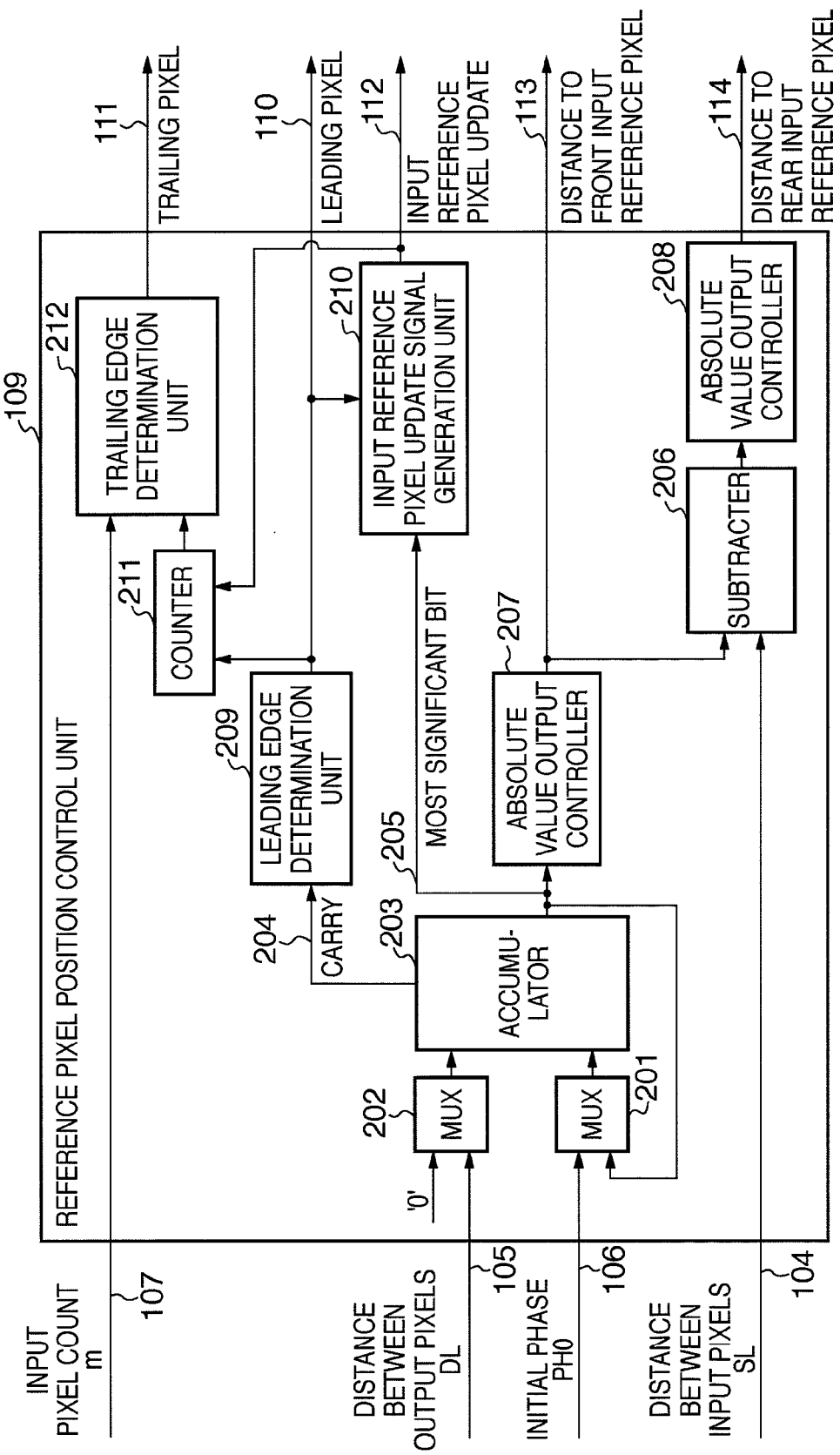
FIG. 2 is a block diagram exemplifying the arrangement of a reference pixel position control unit in the first embodiment.

Preferred embodiments for practicing the present invention will now be explained in detail with reference to the accompanying drawings. The embodiments will be explained by exemplifying an image forming apparatus. However, the present invention is not limited to the image forming apparatus, is applicable to any image enlargement (resolution conversion) processes, and incorporates them.

First Embodiment

<Example of Arrangement of Enlargement Processing Unit (Resolution Converter) in Image Processing According to First Embodiment>

FIG. 1A is a block diagram exemplifying the arrangement of an enlargement processing unit (resolution converter) 100 when the present invention is applied to one-dimensional enlargement processing.

In FIG. 1A, reference numeral 101 denotes input image data; and 102, an image data storage unit which holds the input image data 101. Reference numeral 103 denotes an image data calculation unit which performs enlargement processing for input image data stored in the image data storage unit 102. The image data calculation unit 103 executes calculation based on the linear interpolation method.

A coefficient between reference pixels holding unit 104 holds a distance SL between constituent pixels of input image data. The coefficient between reference pixels holding unit 104 holds, for example, an exponentiation with a base of 2. A coefficient specifying magnification holding unit 105 holds a distance DL between constituent pixels of output image data. An initial phase holding unit 106 holds an initial phase PH0 in the linear interpolation method. A input pixel count holding unit 107 holds the input pixel count in one direction in enlargement processing. In image processing, a value held in the input pixel count holding unit 107 is often the number of pixels in the main scanning direction.

A output pixel count holding unit 108 holds the output pixel count in one direction that are output in enlargement processing by the image data calculation unit 103. The coefficient between reference pixels holding unit 104, coefficient specifying magnification holding unit 105, initial phase holding unit 106, input pixel count holding unit 107, and output pixel count holding unit 108 are registers which can be set by a CPU (not shown) or a processor equivalent to it.

A reference pixel position control unit 109 outputs control signals and calculation coefficients necessary for calculation by the image data calculation unit 103. A control signal 110 indicates a determination result of a leading pixel. A control signal 111 indicates a determination result of a trailing pixel. A control signal 112 indicates a timing to update an input reference pixel for the image data calculation unit 103. Coefficients 113 and 114 are used in calculation by the image data calculation unit 103. The coefficients 113 and 114 indicate distances from an output pixel position to two input reference pixel positions. The coefficient 113 indicates a distance to a rear input reference pixel and the coefficient 114 indicates a distance to a front input reference pixel.

The image data calculation unit 103 uses a control signal 115, as a request signal, to request control signals and calculation coefficients of the reference pixel position control unit 109. The control signal 115 is formed from a pulse signal or the like. The reference pixel position control unit 109 outputs a control signal 116, as a response signal, to the image data calculation unit 103. More specifically, the control signal 116 indicates the valid timings of the control signals 110, 111, and 112 and calculation coefficients 113 and 114 output from the reference pixel position control unit 109.

The image data calculation unit 103 outputs a control signal 117 as a request signal, to the image data storage unit 102. The control signal 117 requests input image data necessary for calculation. When the image data storage unit 102 is configured by a memory, the control signal 117 is formed from an address signal or the like. The image data storage unit 102 outputs image data 118 and 119 based on the control signal 117 output from the image data calculation unit 103.

The image data 118 indicates a front reference pixel data and the image data 119 indicates a rear reference pixel data. The image data calculation unit 103 calculates output image data 120.

<Example of Arrangement of Image Forming Apparatus Having Enlargement Processing Unit (Resolution Converter) According to First Embodiment>

FIG. 1B is a block diagram exemplifying the arrangement of an image forming apparatus having the enlargement processing unit (resolution converter) in FIG. 1A.

In FIG. 1B, input image data include image data of RGB color components from an image reading device and image data of YMCK color components which have already been converted for image formation. However, the input image data are not limited to them. A color space conversion unit 10 converts, for example, image data of RGB color components into those of YMCK color components for image formation.

If image enlargement (resolution conversion) is required, the image data of YMCK color components are input to the enlargement processing unit (resolution converter) 100 of the embodiment and enlarged (resolution-converted). The enlarged image data are then input to a density control unit 20. If no image enlargement (resolution conversion) is necessary, the image data of YMCK color components skip the enlargement processing unit (resolution converter) 100 of the embodiment and are directly input to the density control unit 20.

The density control unit 20 executes various density control processes to achieve appropriate image formation. The density control unit 20 transfers the image data to a printer engine 30.

Note that FIG. 1B shows the schematic arrangement of the image forming apparatus, and detailed control is omitted. FIG. 1B shows the positioning of the enlargement processing unit (resolution converter) 100 of the embodiment in the image forming apparatus.

<Example of Detailed Arrangement of Building Components of Enlargement Processing Unit (Resolution Converter) 100>

Each of the reference pixel position control unit 109 and image data calculation unit 103 which form the enlargement processing unit (resolution converter) 100 in FIG. 1A will be explained in more detail.

(Example of Arrangement of Reference Pixel Position Control Unit 109 According to First Embodiment)

FIG. 2 is a block diagram exemplifying the arrangement of the reference pixel position control unit 109 in the first embodiment. In FIG. 2, the same reference numerals as those in FIG. 1A denote the same signals as those in FIG. 1A.

The reference pixel position control unit 109 operates based on, as a sync signal, the control signal 115 output from the image data calculation unit 103. In response to input of the control signal 115 from the image data calculation unit 103, the reference pixel position control unit 109 outputs control signals and calculation coefficients necessary for calculation by the image data calculation unit 103.

In FIG. 2, reference numerals 201 and 202 denote selectors (to be referred to as a MUX 201 and MUX 202). An accumulator 203 accumulates the output values of the MUXs 201 and 202. Inputs to the MUX 201 are a value PH0 (to be referred to as an initial phase) held in the initial phase holding unit 106 and an output from the accumulator 203. The MUX 201 outputs the initial phase in calculation of the first output pixel in enlargement processing, and after that, selects an output from the accumulator 203. Inputs to the MUX 202 are a value held in the coefficient specifying magnification holding unit 105 and a fixed value "0". The MUX 202 outputs the fixed value "0" in calculation of the first output pixel in enlargement processing, and then, outputs a value DL held in the coefficient specifying magnification holding unit 105.

The accumulator 203 outputs a carry signal 204 indicating an overflow. The carry signal 204 is output when the sum of outputs from the MUXs 201 and 202 exceeds the bit count of the accumulator 203. A control signal 205 for a processing arranged on the subsequent stage corresponds to the most significant bit of the calculation result in the accumulator 203.

A subtracter 206 calculates the difference between the distance SL held in the coefficient between reference pixels holding unit 104 and the output value of the accumulator 203. Absolute value output controllers 207 and 208 perform absolute value output control for the calculation output values of the accumulator 203 and subtracter 206, respectively. The calculation output of the accumulator 203 is output as the calculation coefficient (distance to a front input reference pixel) 113 via the absolute value output controller 207. The calculation coefficient 113 represents the distance between the output pixel position and the first or front input pixel position out of two input reference pixels referred to in calculation of an output pixel. The calculation output of the subtracter 206 is output as the calculation coefficient (distance to an rear input reference pixel) 114 via the absolute value output controller 208. The calculation coefficient 114 represents the distance between the output pixel position and the second or rear input pixel position out of two input reference pixels referred to in calculation of an output pixel. When configuring arithmetic units, it is known that a subtracter is formed from an adder. Thus, even when the subtracter 206 is configured as an adder, the adder corresponds to a subtracter.

A leading edge determination unit 209 operates in accordance with the control signal (carry) 204 output from the accumulator 203, and outputs the leading pixel determination result signal 110. The concrete operation of the leading edge determination unit 209 will be described later. When the image data calculation unit 103 calculates an output pixel, an input reference pixel update signal generation unit 210 controls whether to update an input reference pixel read out from the image data storage unit 102. Based on the control signal (most significant bit) 205 output from the accumulator 203, and the determination signal 110 output from the leading edge determination unit 209, the input reference pixel update signal generation unit 210 generates the control signal 112 for updating an input reference pixel.

A counter 211 counts the control signal 112 output from the input reference pixel update signal generation unit 210 in accordance with a value indicated by the leading pixel determination result signal 110 output from the leading edge determination unit 209. More specifically, the counter 211 does not count the control signal 112 if the leading pixel determination result signal 110 does not exhibit a level valid for counting. That is, the leading pixel determination result signal 110 functions as an operation control signal (enable signal) for the counter 211. A trailing edge determination unit 212 determines a trailing edge in accordance with the output signal of the counter 211 and a value held in the input pixel count holding unit 107. The output value of the counter 211 indicates a count at which the input reference pixel has been updated after the leading edge determination unit 209 determines a leading pixel when calculating an output pixel. Hence, if the value held in the input pixel count holding unit 107 coincides with the output value of the counter 211, the trailing edge determination unit 212 determines that no input pixel can be updated any more, and outputs the trailing pixel determination signal 111. The concrete operation of the trailing edge determination unit 212 will be described as well as the operation of the leading edge determination unit 209.

(Example of Arrangement of Image Data Calculation Unit 103)

Figure 3:
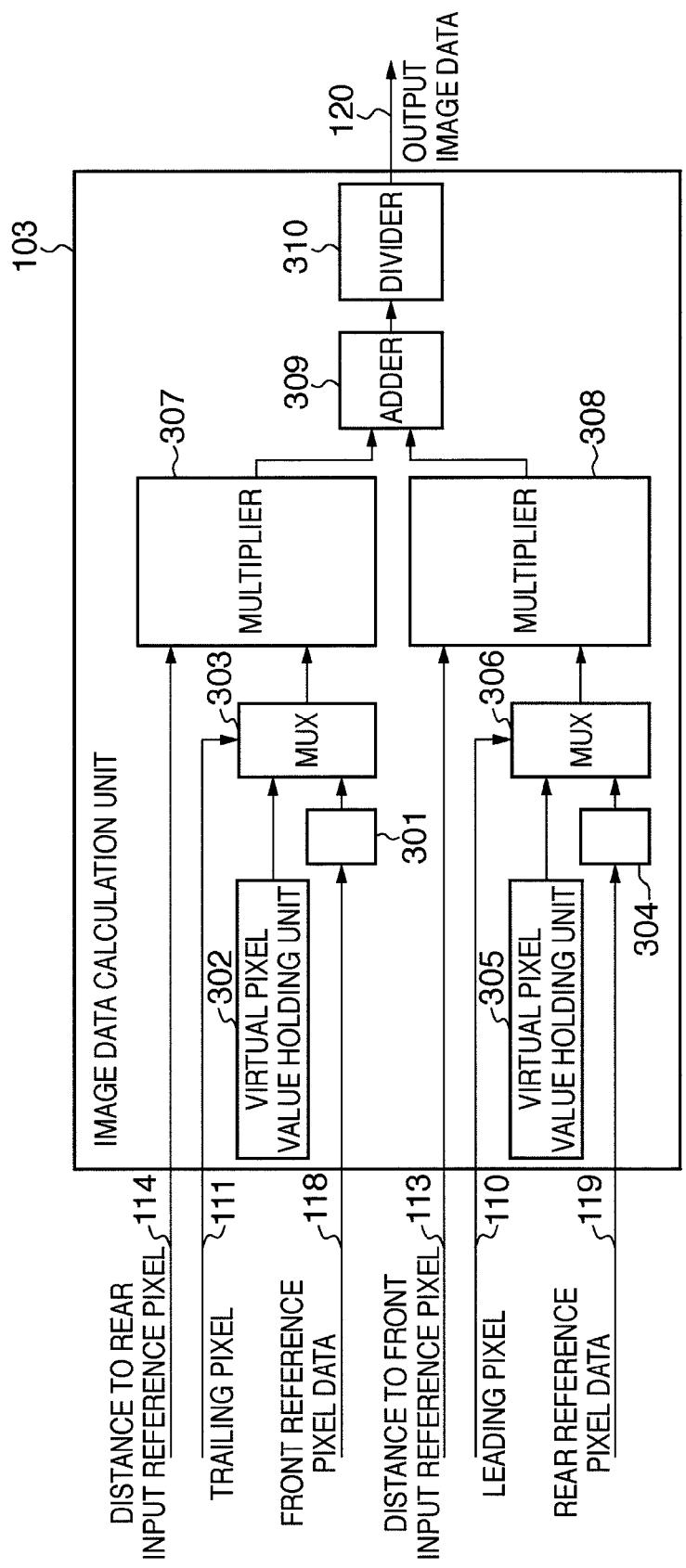
FIG. 3 is a block diagram exemplifying the arrangement of an image data calculation unit in the embodiment.

The arrangement of the image data calculation unit 103 will be explained. FIG. 3 is a block diagram exemplifying the arrangement of the image data calculation unit 103. Also in FIG. 3, the same reference numerals as those in FIG. 1A or 2 denote the same signals.

In FIG. 3, a data holding unit 301 holds the first or front reference pixel data 118 output from the image data storage unit 102. A virtual pixel value holding unit 302 holds a trailing virtual pixel value. A selector 303 (to be referred to as a MUX 303) switches between the value held in the virtual pixel value holding unit 302 and the value of the first input pixel data 118 in accordance with a value represented by the control signal 111 output from the trailing edge determination unit 212. The MUX 303 then outputs the selected value.

A data holding unit 304 holds the second or rear input pixel data 119 output from the image data storage unit 102. A virtual pixel value holding unit 305 holds a leading virtual pixel value. A selector 306 (to be referred to as a MUX 306) switches between the value held in the virtual pixel value holding unit 305 and the value of the second input pixel data 119 in accordance with a value represented by the control signal 110 output from the leading edge determination unit 209. The MUX 306 then outputs the selected value.

In the above description, the holding unit (virtual pixel value holding unit 305) which holds a leading virtual pixel value and the holding unit (virtual pixel value holding unit 302) which holds a trailing virtual pixel value are arranged separately. However, when the same value is held as the virtual pixel values, a common holding unit may be arranged. That is, virtual pixel values input to the MUXs 303 and 306 may be an output from a single virtual pixel value holding unit.

Multipliers 307 and 308 perform weighting calculation using an input reference pixel value and calculation coefficient in output pixel calculation. More specifically, the distance between the first input reference pixel position and the output pixel position is defined as a weighting coefficient. The multiplier 307 multiplies the weighting coefficient and the first input reference pixel data. Also, the distance between the first input reference pixel position and the output pixel position is defined as a weighting coefficient. The multiplier 308 multiplies the weighting coefficient and the second input reference pixel data.

An adder 309 adds the products from the multipliers 307 and 308. A divider 310 divides the sum of the adder 309 by a value SL defined as the distance between constituent pixels of input image data. When the distance SL between constituent pixels of input image data is given by an exponentiation with a base of 2, the divider 310 can execute a shift operation. In this case, the circuit scale or configuration requirements can be simplified.

<Example of Processing When Enlarging Image at 2.5-Magnification According to First Embodiment>

The first embodiment will be explained in more detail by referring to a concrete pixel arrangement view. In the following description, a numerical value "XX" is decimal, and a numerical value "xxxx" is hexadecimal.

(Concept in 2.5-Magnification Enlargement)

Figure 4:
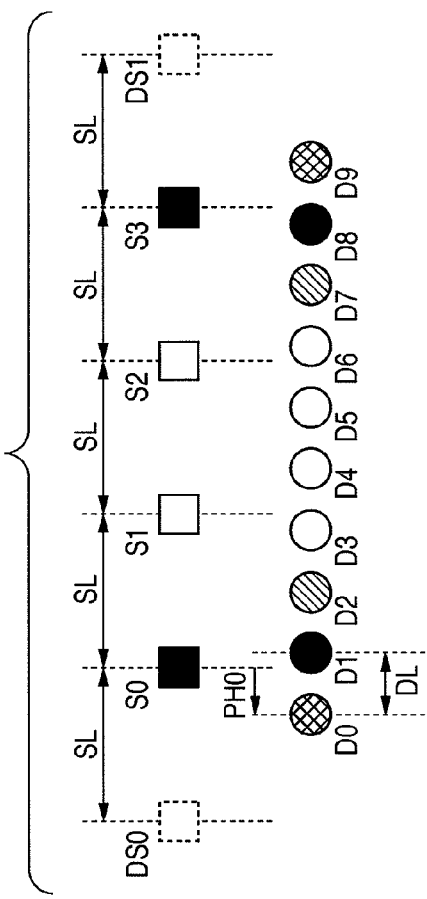
FIG. 4 is a view for explaining 2.5-magnification enlargement processing and initial phase setting in the first embodiment.

FIG. 4 is a view exemplifying processing when enlarging input image data made up of four pixels at 2.5-magnification.

In FIG. 4, a quadrangle in a solid line represents pixel data in an input pixel array before enlargement. The density of the quadrangle indicates the value of input pixel data. A black quadrangle represents a black (high-density) pixel, and a white quadrangle represents a white (low-density) pixel. Among the four pixels of the input pixel data, two pixels S0 and S3 at two ends are black pixels, and two pixels S1 and S2 at the center are white pixels. The S0 position will be called the first input pixel position, and the S3 position will be called the last input pixel position.

SL represents the distance between input pixels represented by quadrangles and is an exponentiation with a base of 2 ("256") in this description. Virtual pixel values DS0 and DS1 are arranged at distances from the pixels S0 and S3 at the two ends each by the distance SL between input pixels. The virtual pixel values DS0 and DS1 are indicated by quadrangles in dotted lines. The DS0 value is held as a leading virtual pixel value in the virtual pixel value holding unit 305 in FIG. 3. The DS1 value is held as a trailing virtual pixel value in the virtual pixel value holding unit 302.

In FIG. 4, a circle represents a pixel value after enlargement processing at 2.5-magnification. The density of the circle indicates that of an output pixel value. DL represents the distance between constituent pixels of output image data. The D0 position will be called the first output pixel position, and the D9 position will be called the last output pixel position. The DL setting value is directly linked to the magnification setting in enlargement processing. In the arrangement of the embodiment, the coefficient specifying magnification holding unit 105 corresponds to a constituent unit which sets DL. The DL setting value is determined by the distance SL between constituent pixels of input image data and the enlargement magnification. More specifically, the DL setting value is obtained by dividing the distance SL between constituent pixels of input image data by the enlargement magnification. For example, when the distance SL between constituent pixels of input image data is "256" and the enlargement magnification is 2.5, the DL setting value is "102" (=256/2.5) upon rounding down the fractional value.

In FIG. 4, PH0 is an initial phase. A feature of the first embodiment is to set the initial phase PH0 in a direction (leftward) opposite to a direction (rightward) in which pixel data are formed. The setting value of the initial phase PH0 is variable in accordance with the magnification of enlargement processing. The setting value is calculated based on the difference between the distance SL between constituent pixels of input image data and the distance DL between constituent pixels of output image data.

Figure 6:
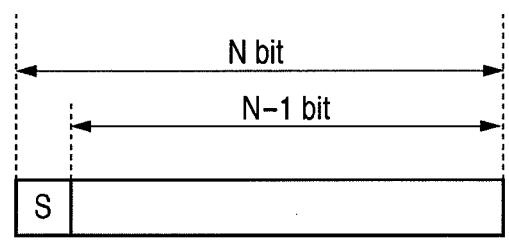
FIG. 6 is a view exemplifying the format of initial phase setting data in the first embodiment.

In the first embodiment, the initial phase setting is defined using the first pixel S0 of input image data as a reference. More specifically, a direction (rightward) in which pixel data are formed is defined as a positive direction with respect to the first pixel S0 of input image data. A direction (leftward) in which the leading virtual pixel DS0 is formed is defined as a negative direction. Since the initial phase value contains a sign, the initial phase held in the initial phase holding unit 106 has, for example, a format as shown in FIG. 6. Referring to FIG. 6, the total bit count of an initial phase to be set is N bits, and the most significant bit holds sign data. In the following description, the format of the initial phase holding unit 106 complies with 2's complement notation. The bit count of the initial phase is determined in accordance with the calculation accuracy in linear interpolation calculation.

(Example of Concrete Processing in 2.5-Magnification Enlargement)

Figure 5:
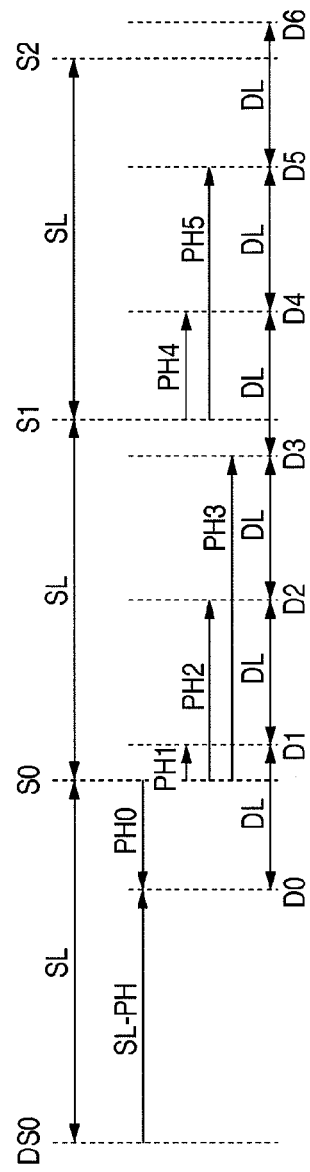
FIG. 5 is a view showing a phase corresponding to an output pixel position in the first embodiment.

FIG. 5 is a view showing the leading virtual pixel DS0, the three pixel positions S0, S1, and S2 from the start of input image data, and the phase states of the seven pixel positions D0 to D6 from the start of output image data. In FIG. 5, the same reference numerals as those in FIG. 4 have the same meanings.

As described above, in the first embodiment, the initial phase PH0 set when enlarging four pixels of input image data at 2.5-magnification and outputting the enlarged image data is calculated from the distance SL between constituent pixels of input image data and the distance DL between constituent pixels of output image data, in order to maintain horizontal symmetry of output image data after enlargement processing. To keep horizontal symmetry of output image data, it suffices to shift the phase with respect to the right and left ends of the input image data by half the difference between a distance corresponding to all pixels which form output image data and that corresponding to all pixels which form input image data.

In the foregoing example, the distance SL between constituent pixels of input image data is "256" and the input image data is formed from four pixels. A distance corresponding to all pixels which form the input image data is given by $$SL\times(\text{number of constituent pixels of input image data}-1)=256\times3=768 \quad (4)$$

The distance DL between constituent pixels of output image data is "102" and the output image data is formed from 10 pixels. A distance corresponding to all pixels which form the output image data is given by $$DL\times(\text{number of constituent pixels of output image data}-1)=102\times9=918 \quad (5)$$

From this, the difference between the distance corresponding to all pixels which form the input image data and that corresponding to all pixels which form the output image data is given by $$918-768=150 \quad (6)$$

To maintain horizontal symmetry, it suffices to shift the phase by only half the value derived from equation (6) in a negative direction with respect to the first pixel which forms the input image data. Accordingly, the initial phase set in the initial phase holding unit 106 is "−75" in decimal notation. When the initial phase is set by 9 bits in accordance with the initial phase format in FIG. 6, the initial phase setting value PH0 in 2's complement notation is "0x1B5".

(Calculation Processing of First Output Pixel D0)

The image data calculation unit 103 outputs the control signal 115 to the reference pixel position control unit 109 as a request for control signals and calculation coefficients necessary in output pixel calculation. Upon receiving the control signal 115 from the image data calculation unit 103, the reference pixel position control unit 109 outputs control signals and calculation coefficients such as a leading pixel determination signal and trailing pixel determination signal. In calculation of the first pixel of the output image, inputs to the accumulator 203, that is, outputs from the MUXs 201 and 202 are the initial phase PH0 and the fixed value "0", respectively. As the calculation coefficient 113 output from the reference pixel position control unit 109, the value (−75) of the initial phase PH0 is converted into an absolute value, directly outputting the absolute value, that is, "75 (0x4B)".

The subtracter 206 calculates the difference between an output from the absolute value output controller 207 and a value held in the coefficient between reference pixels holding unit 104. The subtracter 206 outputs the calculation coefficient 114 via the absolute value output controller 208. More specifically, the subtracter 206 outputs "181 (0xB5)" obtained by subtracting "75" from "256" which is the distance SL between constituent pixels of input image data.

When calculating the first pixel of the output image, an output from the accumulator 203 does not generate a carry, as described above. The control signal 204 is not output, and thus none of the control signals 110, 111, and 112 are output at a significant level.

Upon receiving the control signal 115, the reference pixel position control unit 109 outputs the control signals and calculation coefficients. At a timing when the output is at a significant level, the reference pixel position control unit 109 outputs the control signal 116 to the image data calculation unit 103. In this example, the reference pixel position control unit 109 outputs the control signal 116 at a timing when "75 (0x4B)" and "181 (0xB5)" are output as the calculation coefficients 113 and 114, respectively.

Upon receiving the control signal 116, the image data calculation unit 103 outputs, to the image data storage unit 102 for output pixel calculation, the control signal 117 serving as a request signal of the input image data 118 and 119. Upon receiving the control signal 117, the image data storage unit 102 outputs stored image data. More specifically, the image data storage unit 102 outputs the first input reference pixel data S0 as the image signal 118 and the second input reference pixel data S1 as the image signal 119.

The image data calculation unit 103 calculates an output pixel using the control signals and calculation coefficients output from the reference pixel position control unit 109 and the image data 118 and 119 output from the image data storage unit 102.

In calculation of the first output pixel D0, none of the control signals 110, 111, and 112 are at a significant level at the timing when the reference pixel position control unit 109 outputs the control signal 116. If the control signal 111 is not output from the trailing edge determination unit 212, the MUX 303 in FIG. 3 outputs the input image data 118. If the control signal 110 is not output from the leading edge determination unit 209, the MUX 306 outputs a value held in the virtual pixel value holding unit 305.

Accordingly, the multiplier 307 multiplies the image data 118 serving as the first reference pixel data of the input image and the calculation coefficient 114 ("0xB5"). The multiplier 308 multiplies the value held in the virtual pixel value holding unit 305 and the calculation coefficient 113 ("0x4B"). The adder 309 adds the products from the multipliers 307 and 308, and the divider 310 divides the sum. In this description, since the distance SL between constituent pixels of the input image data is an exponentiation with a base of 2 ("256"), the calculation of the divider 310 can be achieved by an 8-bit shift. An output from the divider 310, that is, the first pixel D0 of the output image is given by $$D0=(S0\times\text{``0xB5''}+DS0\times\text{``0x4B''})/\text{``0x100''} \quad (7)$$

In the input pixel arrangement shown in FIG. 5, the S0 value represents black ("0x00") and the DS0 value represents white ("0xFF"). The S0 and DS0 values are substituted into equation (7), obtaining "74 (0x4A)".

(Calculation Processing of Second Output Pixel D1)

Calculation of the second output pixel D1 will be explained. The image data calculation unit 103 outputs the control signal 115 to calculate the second output pixel D1. Then, the reference pixel position control unit 109 outputs control signals, and calculation coefficients necessary for calculation of the second pixel of the output image. When the image data calculation unit 103 outputs the control signal 115 to calculate the second output pixel, the reference pixel position control unit 109 outputs control signals and the calculation coefficients 113 and 114 corresponding to this pixel.

Because of calculation of the second output pixel, an output from the MUX 201 is not a value held in the initial phase holding unit 106 but "−75 (0x1B5)" serving as an output from the accumulator 203. In contrast, an output from the MUX 202 is switched from the fixed value "0" to a value held in the coefficient specifying magnification holding unit 105. As a result, the MUX 202 outputs "102 (0x66)" serving as the value of the distance DL between constituent pixels of the output image data that corresponds to the set magnification. The accumulator 203 adds the values of the MUXs 201 and 202. Since the output from the MUX 201 is "0x1B5" and that from the MUX 202 is "0x66", the output from the accumulator 203 is "0x21B". In this case, the accumulator 203 outputs the control signal 204 at a significant level, and the value of the calculation result is "0x01B". The absolute value output controllers 207 and 208 output "27 (0x1B)" and "229 (0xE5)", respectively.

These values indicate the phase of the second output pixel D1 in FIG. 5. PH1 in FIG. 5 corresponds to the output value "0x1B" of the absolute value output controller 207. After PH1 is determined, the distance from the image data 119 of the input reference pixel S1 to the second output pixel D1 is attained by subtracting PH1 from the distance SL between constituent pixels of input image data. This distance corresponds to the output value "0xE5" of the absolute value output controller 208.

Since the accumulator 203 outputs the control signal 204, the leading edge determination unit 209 determines a leading pixel. The determination processing of the leading edge determination unit 209 is to output the leading pixel determination signal 110 upon receiving the control signal 204. Outputting the leading pixel determination signal 110 is outputting a value meaning a significant level. The output is "1" for positive logic and "0" for negative logic. In the following description, outputting a control signal means outputting a significant level.

The input reference pixel update signal generation unit 210 outputs the control signal 112 based on the control signal 205. However, the input reference pixel update signal generation unit 210 does not output the control signal 112 until the leading edge determination unit 209 outputs the control signal 110. In calculation of the second output pixel D1, the leading edge determination unit 209 outputs the control signal 110 at a significant level. At this timing, the input reference pixel update signal generation unit 210 does not output the control signal 112 regardless of the control signal 205 owing to synchronous control.

Similar to calculation of the first output pixel, the reference pixel position control unit 109 outputs control signals and calculation coefficients. At the output timing, the reference pixel position control unit 109 outputs the control signal 116 to the image data calculation unit 103. Upon receiving the control signal 116, the image data calculation unit 103 starts calculating output image data. When the reference pixel position control unit 109 outputs the control signal 116, neither the control signal 110 nor 112 has been output, so no input pixel data is updated. That is, data in the data holding units 301 and 302 are not updated.

Even when neither the data holding unit 301 nor 302 is updated, the image data calculation unit 103 may output the control signal 117. For example, the same data as that in calculation of the first output pixel may be received by setting the memory address in the image data storage unit 102 to the same value. It is also possible not to output the control signal 117 when the reference pixel position control unit 109 does not output the control signal 112 indicating update of an input reference pixel.

The image data calculation unit 103 calculates the second output pixel D1 based on the control signals and calculation coefficients 113 and 114 output from the reference pixel position control unit 109. More specifically, the leading edge determination unit 209 outputs the control signal 110 at a significant level, and the output of the MUX 306 is switched to the image data 119. Since the trailing edge determination unit 212 does not output the control signal 111, the MUX 303 outputs the image data 118.

The multiplier 307 multiplies the calculation coefficient 114 ("229") and the image data 118 (S0) output from the MUX 303. The multiplier 308 multiplies the calculation coefficient 113 ("27") and the image data 119 (S1) output from the MUX 306. Similar to calculation of the first output pixel, the adder 309 adds the output values of the multipliers 307 and 308, and the divider 310 divides the sum.

(Calculation Processing of Third Output Pixel D2)

Calculation of the third output pixel D2 of output image data will be explained. Similar to calculation of the second output pixel D1, the image data calculation unit 103 outputs the control signal 115 to the reference pixel position control unit 109. Upon receiving the control signal 115 from the image data calculation unit 103, the reference pixel position control unit 109 outputs control signals and the calculation coefficients 113 and 114 for calculation of the third output pixel D2. The calculation coefficient 113 is obtained based on an output from the accumulator 203 in calculation of the second output pixel. An output from the MUX 201 is an output from the accumulator 203 in calculation of the second output pixel. An output from the MUX 202 is a value held in the coefficient specifying magnification holding unit 105. The accumulator 203 adds the output values of the MUXs 201 and 202. More specifically, the accumulator 203 adds "27 (0x1B)" output from the MUX 201 and "102 (0x66)" output from the MUX 202, and outputs "129 (0x81)". The output value of the accumulator 203 at this time is determined, so the subtraction value of the subtracter 206 is determined to be "127 (0x7F)".

These values indicate the phase of the third output pixel D2 in FIG. 5. PH2 in FIG. 5 corresponds to the output value ("0x81") of the absolute value output controller 207. After PH2 is determined, the distance from the image data 119 of the input reference pixel S1 to the third output pixel D2 is attained by subtracting PH2 from the distance SL between constituent pixels of input image data. This distance corresponds to the output value ("0x7F") of the absolute value output controller 208.

The image data calculation unit 103 calculates the third output pixel data D2 based on the control signals and calculation coefficients 113 and 114 output from the reference pixel position control unit 109. More specifically, the leading edge determination unit 209 outputs the control signal 110 at a significant level, and the output of the MUX 306 is switched to the image data 119. Since the trailing edge determination unit 212 does not output the control signal 111, the MUX 303 outputs the image data 118.

The multiplier 307 multiplies the calculation coefficient 114 ("127") and the image data 118 (S0) output from the MUX 303. The multiplier 308 multiplies the calculation coefficient 113 ("129") and the image data 119 (S1) output from the MUX 306. Similar to calculation of the first and second output pixels, the adder 309 adds the output values of the multipliers 307 and 308, and the divider 310 divides the sum.

(Calculation Processing of Fourth Output Pixel D3)

Calculation of the fourth output pixel D3 of output image data will be explained. Similar to calculation of the third output pixel D2, the image data calculation unit 103 outputs the control signal 115 to the reference pixel position control unit 109. Upon receiving the control signal 115 from the image data calculation unit 103, the reference pixel position control unit 109 outputs control signals and the calculation coefficients 113 and 114 for calculation of the fourth output pixel D3. The calculation coefficient 113 is obtained based on an output from the accumulator 203 in calculation of the third output pixel. An output from the MUX 201 is an output from the accumulator 203 in calculation of the third output pixel. An output from the MUX 202 is a value held in the coefficient specifying magnification holding unit 105. The accumulator 203 adds the output values of the MUXs 201 and 202. More specifically, the accumulator 203 adds "129 (0x81)" output from the MUX 201 and "102 (0x66)" output from the MUX 202, and outputs "231 (0xE7)". The output value of the accumulator 203 at this time is determined, so the subtraction value of the subtracter 206 is determined to be "25 (0x19)".

These values indicate the phase of the fourth output pixel D3 in FIG. 5. PH3 in FIG. 5 corresponds to the output value ("0xE7") of the absolute value output controller 208. After PH3 is determined, the distance from the image data 119 of the input reference pixel S1 to the fourth output pixel D3 is attained by subtracting PH3 from the distance SL between constituent pixels of input image data. This distance corresponds to the output value ("0x19") of the absolute value output controller 207.

The image data calculation unit 103 calculates the fourth output pixel data D3 based on the control signals and calculation coefficients 113 and 114 output from the reference pixel position control unit 109. More specifically, the leading edge determination unit 209 outputs the control signal 110 at a significant level, and the output of the MUX 306 is switched to the image data 119. Since the trailing edge determination unit 212 does not output the control signal 111, the MUX 303 outputs the image data 118.

The multiplier 307 multiplies the calculation coefficient 114 ("25") and the image data 118 (S0) output from the MUX 303. The multiplier 308 multiplies the calculation coefficient 113 ("231") and the image data 119 (S1) output from the MUX 306. Similar to the preceding output pixel calculation, the adder 309 adds the output values of the multipliers 307 and 308, and the divider 310 divides the sum.

(Calculation Processing of Fifth Output Pixel D4)

Calculation of the fifth output pixel D4 of output image data will be explained. Similar to calculation of the fourth output pixel D3, the image data calculation unit 103 outputs the control signal 115 to the reference pixel position control unit 109. Upon receiving the control signal 115 from the image data calculation unit 103, the reference pixel position control unit 109 outputs control signals and the calculation coefficients 113 and 114 for calculation of the fifth output pixel D4. The calculation coefficient 113 is obtained based on an output from the accumulator 203 in calculation of the fourth output pixel. An output from the MUX 201 is an output from the accumulator 203 in calculation of the fourth output pixel. An output from the MUX 202 is a value held in the coefficient specifying magnification holding unit 105. The accumulator 203 adds the output values of the MUXs 201 and 202. More specifically, the accumulator 203 adds "231 (0xE7)" output from the MUX 201 and "102 (0x66)" output from the MUX 202. The sum is "333 (0x14D)".

The most significant bit of the 9-bit sum of the accumulator 203 in calculation of the fifth output pixel exhibits a value "1", which means output of the control signal 205 to the input reference pixel update signal generation unit 210. The control signal 110, which is an output from the leading edge determination unit 209, has been output in calculation of the second output pixel. The input reference pixel update signal generation unit 210 outputs the control signal 205 as the control signal 112. In calculation of the fifth output pixel, therefore, the control signals 110 and 112 and the two calculation coefficients are output at a significant level at the timing when the control signal 116 is output.

Upon receiving the control signals and two calculation coefficients from the reference pixel position control unit 109, the image data calculation unit 103 starts calculation processing of the fifth output pixel. In calculation of the fifth output pixel, the control signal 112 has been output, unlike the preceding output pixel calculation. The control signal 112 represents update of the input reference pixel. Thus, the image data calculation unit 103 updates input image data held in the data holding units 301 and 302.

Update of input image data is done based on the control signal 117 output from the image data calculation unit 103 to the image data storage unit 102. Upon receiving the control signal 117 from the image data calculation unit 103 to designate update of the input reference pixel, the image data storage unit 102 outputs the image data 118 and 119. After the input reference pixel data is updated, the image data 118 indicates the second input pixel S1 and the image data 119 indicates the third input pixel S2. The data holding unit 301 of the image data calculation unit 103 holds the image data 118 (S1), and the data holding unit 302 holds the image data 119 (S2).

In calculation of the fifth output pixel, the calculation coefficient 113 provides lower 8 bits of the accumulator 203 via the absolute value output controller 207. That is, "77 (0x4D)", which represents lower 8 bits of the sum "333 (0x14D)", is output. This value indicates a phase PH4 in FIG. 5 from the second pixel S1 to the fifth output pixel D4. After PH4 is determined, the distance from the third pixel S2 to the fifth output pixel D4 is attained by subtracting PH4 from SL. This distance corresponds to an output from the subtracter 206 via the absolute value output controller 208, and is "179 (0xB3)".

The image data calculation unit 103 calculates the fifth output pixel data D4 based on the control signals and calculation coefficients 113 and 114 output from the reference pixel position control unit 109. More specifically, the leading edge determination unit 209 outputs the control signal 110 at a significant level, and the output of the MUX 306 is switched to the image data 119. Since the trailing edge determination unit 212 does not output the control signal 111, the MUX 303 outputs the image data 118. The multiplier 307 multiplies the calculation coefficient 114 ("179") and the image data 118 (S1) output from the MUX 303. The multiplier 308 multiplies the calculation coefficient 113 ("77") and the image data 119 (S2) output from the MUX 306. Similar to the preceding output pixel calculation, the adder 309 adds the output values of the multipliers 307 and 308, and the divider 310 divides the sum.

In this manner, update of the input reference pixel is controlled using the calculation result of the accumulator 203. The phase between the input reference pixel position and the output pixel position is output as a calculation coefficient. The image data calculation unit 103 can calculate an output pixel value.

(Calculation Processing of 10th Output Pixel D9)

Output of the control signal 111 of the trailing edge determination unit 212 will be explained. The input reference pixel update signal generation unit 210 outputs the control signal 112 in accordance with the control signal 205, that is, the output value of the accumulator 203. The counter 211 counts control signals 112 after the leading edge determination unit 209 outputs the control signal 110. In this description, there are four input pixels, so the counter 211 executes counting four times. The trailing edge determination unit 212 compares the output value of the counter 211 with a value held in the input pixel count holding unit 107. If these values match each other, the trailing edge determination unit 212 outputs the control signal 111.

In four update operations of input reference pixel data, the data holding units 301 and 302 in the image data calculation unit 103 update held data every update. In this example, the data holding unit 302 holds the fourth input data S3 after the four update operations. Since data held in the data holding unit 301 at this time does not exist in input pixels, the data holding unit 301 holds data before update or invalid data.

After the control signal 111 is output, the MUX 303 in the image data calculation unit 103 is switched. As a result, not data held in the data holding unit 301 but data held in the virtual pixel value holding unit 302 is output as an output from the MUX 303.

In accordance with the control signal 110 output from the leading edge determination unit 209, the MUX 306 outputs a value held in the data holding unit 304. The multiplier 307 multiplies the output from the MUX 303, that is, the value held in the virtual pixel value holding unit 302 and the calculation coefficient 114 output from the reference pixel position control unit 109 at that time. Similarly, the multiplier 308 multiplies the output from the MUX 306, that is, the value held in the data holding unit 304 and the calculation coefficient 113 output from the reference pixel position control unit 109 at that time.

Since the initial phase is set in a direction (negative direction) opposite to one in which pixels are formed, the calculation coefficients 113 and 114 at the trailing edge of output image data do not shift the phase horizontally asymmetrically with respect to the input image data position. That is, even the calculation coefficients 113 and 114 at the trailing edge of output image data exhibit a phase appropriate for maintaining horizontal symmetry.

Accordingly, the input image of the four pixels S0 to S3 in which the pixels at right and left ends are black is horizontally symmetrically enlarged at 2.5-magnification (D0 to D9), as shown in FIG. 4. As is also apparent from FIG. 4, enlargement processing can be achieved while keeping the symmetry of an input image, by setting the initial phase in a direction opposite to one in which pixels are formed.

Whether to end enlargement processing is determined by comparing the number of pixels output from the image data calculation unit 103 and data held in the output pixel count holding unit 108 that is set by the CPU. More specifically, the value of a counter (not shown) for counting the output pixel count is compared with data held in the output pixel count holding unit 108. When the output pixel count reaches the held value, the enlargement processing is completed.

<Example of Processing When Enlarging Image at 2.0-Magnification According to First Embodiment>

The example of processing when enlarging an image at 2.5-magnification has been described in detail with reference to FIGS. 4 to 6.

Figure 7:
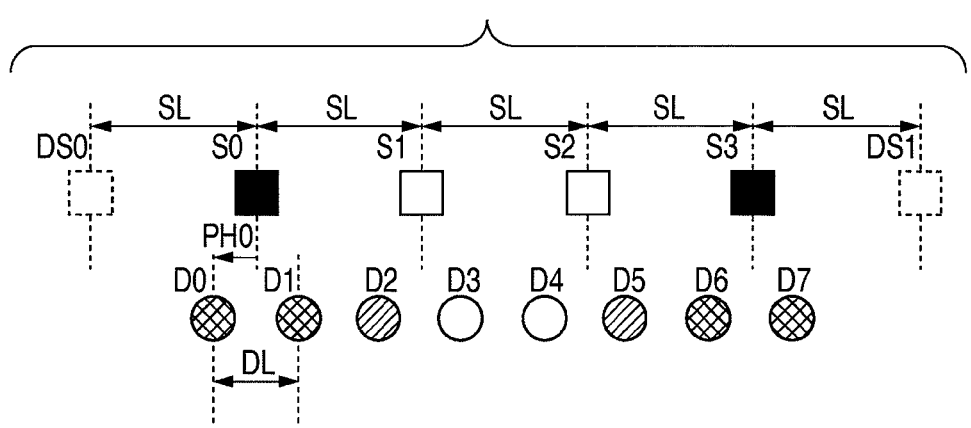
FIG. 7 is a view for explaining 2.0-magnification enlargement processing and initial phase setting in the first embodiment.

FIG. 7 exemplifies processing when enlarging an image at 2.0-magnification.

In the example of FIG. 7, the basic operation is the same as that of the 2.5-magnification enlargement processing except that the distance DL between output pixels is half the distance SL between input pixels and the initial phase PH0 is DL/2.

According to the arrangements of FIGS. 1A, 1B, 2, and 3 in the first embodiment, virtual pixels DS0 and DS1 are arranged outside the two, left and right ends based on input pixel data S0 to S3. A negative initial phase PH0 from the first input pixel S0 is set. Then, output pixel data D0 to D7 are linearly interpolated based on distances from the input pixel data S0 to S3 and virtual pixels DS0 and DS1 which sandwich the output pixel data D0 to D7. As a result, a 2.0-magnification-enlarged (resolution-converted) image made up of the high-quality output pixel data D0 to D7 which keep symmetry can be provided.

Although horizontal symmetry has been explained, the concept of enlargement by interpolation of the present invention is applied to vertical symmetry as well. However, the control changes between the horizontal direction (main scanning direction) and the vertical direction (sub-scanning direction) in image formation and the like having the main scanning direction and sub-scanning direction.

<Example of Application of First Embodiment to Two-dimensional Image in Enlargement (Resolution Conversion)>

For descriptive convenience, one-dimensional image data has been explained. However, the first embodiment is applicable to two-dimensional image data, too. Horizontal enlargement processing and vertical enlargement processing are executed independently by applying the method of the first embodiment.

Figure 8:
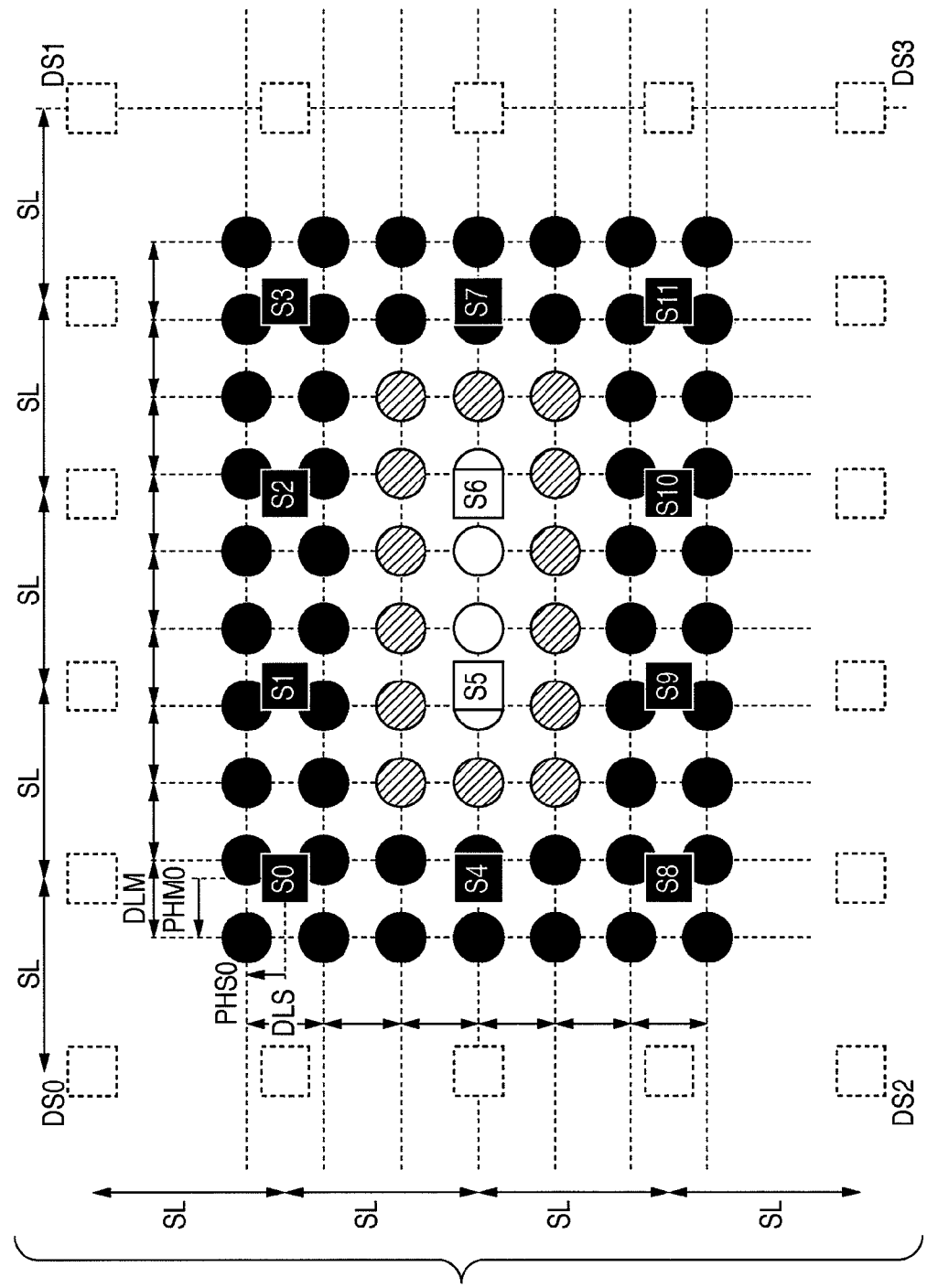
FIG. 8 is a view exemplifying an application of enlargement processing of the first embodiment to two-dimensional image data.

FIG. 8 is a conceptual view showing an application of the first embodiment to two-dimensional image data.

In FIG. 8, quadrangles in solid lines represent pixel data S0 to S11 of an input image. The density of the quadrangle indicates a pixel level. A black quadrangle represents high density (black), and a white quadrangle represents low density (white).

The input image is formed from a total of 12 pixels in which peripheral pixels S0 to S4 and S7 to S11 are black pixels and two center pixels S5 and S6 are white pixels. SL represents the distance between constituent pixels of an input image. DLM represents the distance between constituent pixels of an output image in the main scanning direction, and DLS represents the distance between constituent pixels in the sub-scanning direction. When the enlargement magnification is set to be equal between the main scanning direction and the sub-scanning direction, DLM and DLS have the same value.

Quadrangles in dotted lines represent virtual pixel data DS0, DS1, DS2, and DS3. When the first embodiment is applied to image data, all virtual image data are often set to the same value.

Even when the present invention is applied to two-dimensional image data, the concept of setting initial phases in the main scanning direction and sub-scanning direction is the same as that for one-dimensional image data. That is, the initial phase is set to a value based on the number of pixels of input image data in the main scanning direction/sub-scanning direction, the number of pixels of output image data generated at an enlargement magnification in the main scanning direction/sub-scanning direction, and the distance between constituent pixels.

When the enlargement magnification is set to 2.5 in both the main scanning direction and sub-scanning direction in the example of FIG. 8, the output pixel count in the main scanning direction is 10 and that of pixels in the sub-scanning direction is 7. When the distance SL between constituent pixels of an input image is "256" which is an exponentiation with a base of 2, the distances DLM and DLS between constituent pixels of the output image are given by equation (8).

$$DLM(DLS) = SL/\text{enlargement magnification} \quad (8)$$
$$= 256/2.5 = 102$$

An output image having 10 pixels in the main scanning direction and seven pixels in the sub-scanning direction is obtained by enlarging at 2.5-magnification input image data having four pixels in the main scanning direction and three pixels in the main scanning direction. In this case, a distance corresponding to all pixels which form the input image in the main scanning direction is "768" according to equation (4). Similarly, a distance corresponding to all pixels which form the input image in the sub-scanning direction is "512".

To the contrary, a distance corresponding to all pixels which form the output image in the sub-scanning direction is "918" according to equation (5). Also, a distance corresponding to all pixels which form the output image in the sub-scanning direction is "612".

The difference between the distance corresponding to all pixels which form the input image data in the main scanning direction and that corresponding to all pixels which form the output image in the main scanning direction is given by equation (9). The difference between the distance corresponding to all pixels which form the input image data in the sub-scanning direction and that corresponding to all pixels which form the output image in the sub-scanning direction is given by equation (10).

$$918-768=150 \quad (9)$$

$$612-512=100 \quad (10)$$

From this, initial phase values are set to "−75" in a main scanning direction PHM and "−50" in a sub-scanning direction PHS. In the first embodiment, even when the enlargement magnification is equal between the main scanning direction and the sub-scanning direction in an input image having different numbers of pixels in the main scanning direction and sub-scanning direction, different initial phase values are set in the respective directions.

When the present invention is applied to two-dimensional image data, the building components shown in FIG. 2 are arranged individually in the main scanning direction and sub-scanning direction. More specifically, accumulators, leading edge determination units, input reference pixel update signal generation units, counters, and trailing edge determination units are arranged and controlled independently in the respective directions in which pixels are formed. The leading edge determination unit and trailing edge determination unit for the main scanning direction clear control signals upon completion of inputting pixel data of one line and outputting corresponding output image data. That is, the control signals 110 and 111 function for each line. The leading edge determination unit and trailing edge determination unit for the sub-scanning direction clear control signals upon completion of inputting all input pixel data and outputting corresponding output image data.

<Example of Sequence of Image Enlargement (Resolution Conversion) Processing According to First Embodiment>

Figure 9:
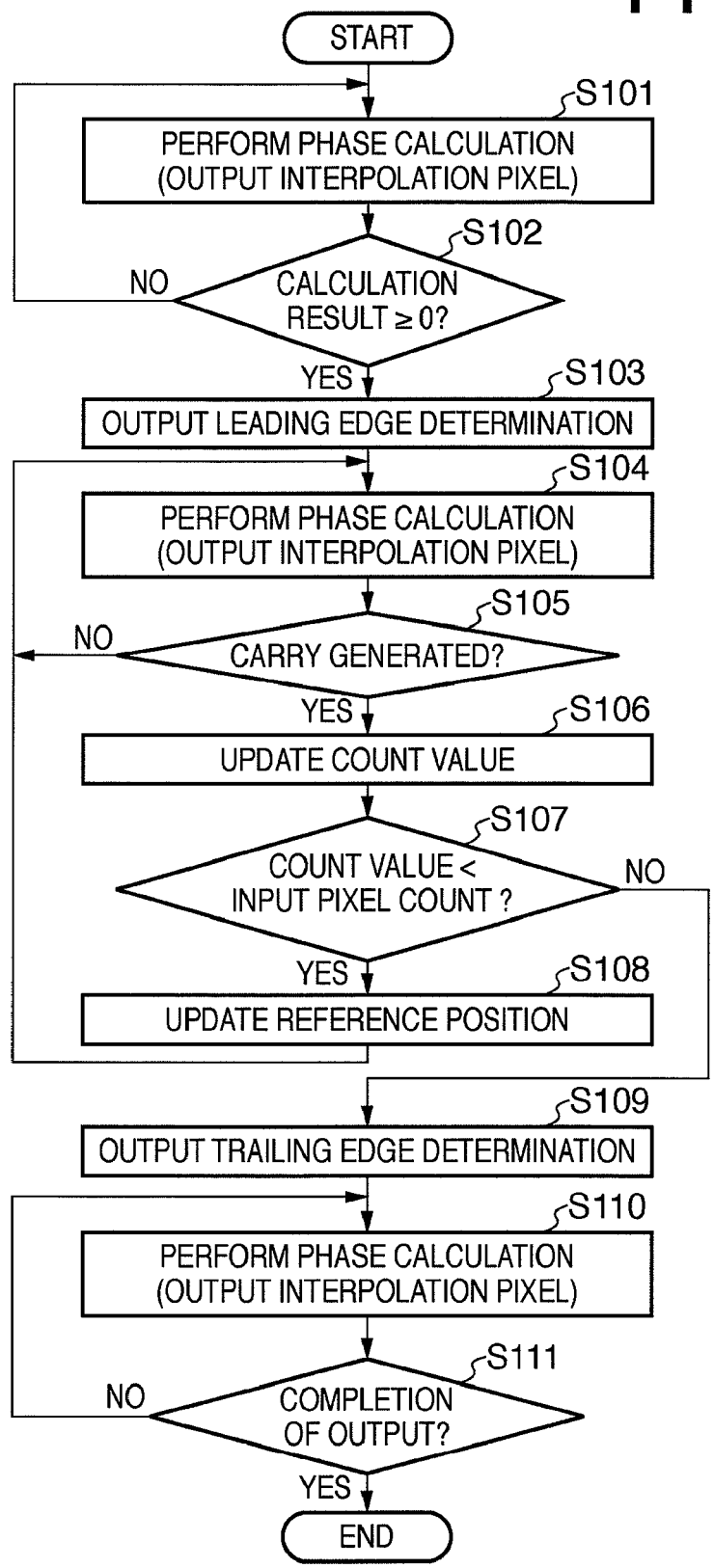
FIG. 9 is a flowchart exemplifying an operation sequence in the first embodiment.

FIG. 9 is a flowchart exemplifying the sequence of image enlargement (resolution conversion) processing in the first embodiment. This processing is executed by a CPU (not shown) which controls or implements the functional blocks in FIGS. 1A, 1B, 2, and 3.

After determining the number of constituent pixels of input image data and the enlargement magnification, the CPU, which makes various settings of the apparatus in the embodiment, executes the following settings. More specifically, the CPU sets the coefficient between reference pixels holding unit 104, coefficient specifying magnification holding unit 105, initial phase holding unit 106, input pixel count holding unit 107, and output pixel count holding unit 108. Then, the CPU activates enlargement processing.

When the CPU activates the enlargement processing, each processing unit of the apparatus in the embodiment starts the enlargement processing. The image data calculation unit 103 requests the reference pixel position control unit 109 to generate various control signals and output calculation coefficients necessary for linear interpolation calculation. In response to the request, the reference pixel position control unit 109 executes phase calculation (step S101). Since an initial phase to be set is negative data, enlargement processing calculation continues until the sum of accumulated distances between constituent pixels of output image data becomes a positive value. Then, the first output pixel data is output (step S102). Calculation of the first output pixel data uses the first input pixel data input from the image data storage unit 102 at the beginning and a virtual pixel data value.

After detecting a carry at which the accumulated output has a positive value, the leading edge determination unit 209 outputs the control signal 110 (step S103). After the leading edge determination unit 209 outputs the control signal 110, an output pixel is calculated using pixel data input from the image data storage unit 102 without using a virtual pixel data value. In the subsequent processing, the most significant bit of the accumulated output is handled as the carry of an input reference pixel update signal, instead of the carry of the accumulator.

The image data calculation unit 103 does not update the input reference pixel until the reference pixel position control unit 109 outputs an input reference pixel update signal. In other words, the image data calculation unit 103 repeats phase calculation to calculate and output an output pixel (steps S104 and S105). When the input reference pixel update signal is output based on the most significant bit of an accumulated output, the image data calculation unit 103 updates the input pixel data used for calculation. By using the updated input pixel data, the image data calculation unit 103 continuously executes phase calculation and output pixel calculation. More specifically, the image data calculation unit 103 receives input pixel data to be referred to next from the image data storage unit 102, and continues output pixel calculation.

The counter 211 counts the number of input reference pixel update signals generated after outputting the control signal 110 of the leading edge determination unit 209 (step S106). The apparatus of the first embodiment repeats update of the input reference pixel, phase calculation, and output pixel calculation until the count value of the counter 211 reaches the input pixel count set by the CPU (steps S104 to S108).

If the count value of the counter 211 has reached the input pixel count set by the CPU (NO in S107), the trailing edge determination unit 212 outputs the trailing edge determination control signal 111 (step S109). After that, phase calculation and output pixel calculation are performed until the number of pixels output from the image data calculation unit 103 reaches a value set by the CPU (steps S110 and S111). After the trailing edge determination unit 212 outputs the trailing edge determination control signal 111, output pixel calculation is done using the last input pixel data and virtual pixel data.

<Example of Image Enlargement Unit (Resolution Converter) Configured by Computer According to First Embodiment>

Figure 10:
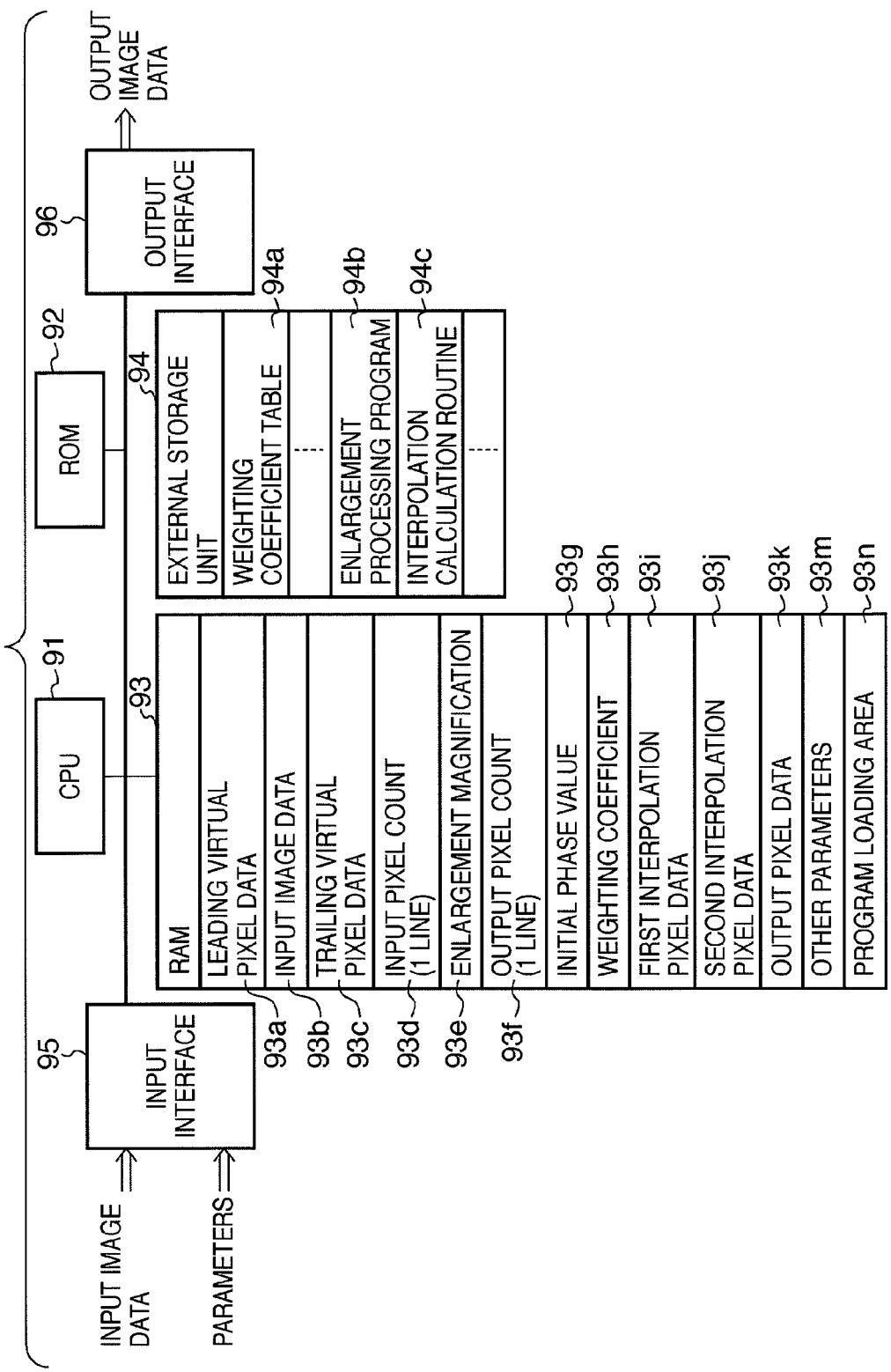
FIG. 10 is a block diagram exemplifying an enlargement processing unit implemented by a computer in the embodiment.

FIG. 10 is a block diagram exemplifying an image enlargement unit (resolution converter) configured by a computer in the first embodiment.

The operation sequence of the computer having this arrangement is basically the same as the flowchart of FIG. 9. The computer with this arrangement can read out a weighting value and the like for subsequent interpolation from a "weighting table 94*a*" in FIG. 10 prepared in advance and calculate them as long as an initial phase value is calculated from an enlargement magnification. For this reason, output pixel data need not be calculated sequentially along with a change of the phase, unlike the arrangements in FIGS. 1A to 3, and the calculation time can therefore be shortened.

For example, if a CPU 91 is capable of high-speed processing, it can receive input pixel data of one or a plurality of lines to calculate enlarged output pixel data and output it at a timing synchronized with subsequent processing. For two-dimensional image data, the CPU 91 can calculate enlarged output pixel data at once from input pixel data of one page.

In FIG. 10, the calculation/control CPU 91 controls the overall image enlargement unit (resolution converter) 100. A ROM 92 stores permanent programs and parameters for initialization and the like. A RAM 93 primarily stores data and the like while the CPU 91 executes a program. The RAM 93 also primarily stores image data.

The RAM 93 reserves the following storage areas. These storage areas are data storage areas indispensable for the operation in the first embodiment. A storage area for general-purpose data is not shown. An area 93*a* stores leading virtual pixel data (e.g., DS0 in FIG. 4) set outside the leading edge in the scanning direction in the first embodiment. An area 93*b* stores input image data in the scanning direction. An area 93*c* stores trailing virtual pixel data (e.g., DS1 in FIG. 4) set outside the trailing edge in the scanning direction in the first embodiment. An area 93*d* stores the input pixel count of one line in the scanning direction. An area 93*e* stores the enlargement magnification. An area 93*f* stores the output pixel count after enlargement of one line in the scanning direction.

An area 93*g* stores an initial phase value (e.g., PH0 in FIG. 4) calculated from the numbers of input and output pixels. An area 93*h* stores a weighting coefficient for calculating output pixel data by the linear interpolation method. The weighing coefficient is acquired from a weighting coefficient table 94*a* prepared in an external storage unit 94 (to be described later) based on the output pixel position. An area 93*i* stores the first or front pixel data at a front of the output pixel position in order to calculate output pixel data by the linear interpolation method. An area 93*j* stores the second or rear pixel data at a rear of the output pixel position in order to calculate output pixel data by the linear interpolation method. When the first or front pixel data and second or rear pixel data are directly read out from the leading virtual pixel data 93*a*, input image data 93*b*, and trailing virtual pixel data 93*c*, neither the area 93*i* nor 93*j* is necessary. An area 93*k* stores output pixel data calculated from the first pixel data 93*i* and second pixel data 93*j* based on the weighing coefficient 93*h*.

An area 93*m* stores other parameters used to execute a program by the CPU 91. A program to be executed by the CPU 91 is loaded from the external storage unit 94 (to be described below) to an area 93*n*.

The external storage unit 94 is a nonvolatile storage unit such as a disk. As the storage areas of the external storage unit 94, only those of programs and data essential for the operation in the first embodiment are shown. A storage area for general-purpose programs and data is not shown. The area 94a stores a weighting coefficient table prepared in advance based on the output pixel position. The area 94b stores an enlargement processing program corresponding to the above-described flowchart of FIG. 9. An area 94c stores an interpolation calculation routine for calculating output pixel data from virtual pixel data and input pixel data by interpolation in order to use the output pixel data by the enlargement processing program 94b.

An input interface 95 interfaces image data and parameters to be input to the enlargement processing unit 100. An output interface 96 interfaces enlarged image data to be output from the enlargement processing unit 100.

Note that the CPU 91 in FIG. 10 is a processor dedicated to the enlargement processing unit 100, but may be a processor which also controls other processes and the overall image forming apparatus.

<Effects of First Embodiment>

The apparatus according to the first embodiment uses virtual pixel data to execute linear interpolation calculation at the leading and trailing edges of pixel data which form an input image. A value as an initial phase is set not between the first and second pixels which form an input image, but between virtual pixel data and the first pixel. The set value is calculated based on the difference between the distance between constituent pixels of input image data and that between constituent pixels of output image data. When image data to be enlarged is two-dimensional, initial phases are set separately in the main scanning direction and sub-scanning direction by the calculation even if the enlargement magnification is equal between these directions. With these settings, proper enlargement processing can be done while maintaining the symmetry of input image data.

Second Embodiment

In the first embodiment, the first input pixel position is used as a reference to set an initial phase in a direction (negative direction) opposite to one in which input image data are formed. However, a feature of the present invention is not setting an initial phase between the first and second pixel data of an input image, like a conventional linear interpolation method, but setting it before the first pixel data of an input image (in a negative direction). When virtual pixel data is arranged before the first input pixel data, the initial phase can be set using the virtual pixel data as a reference.

A case in which the initial phase is set using, as a reference, virtual pixel data arranged before the first input pixel data will be exemplified.

<Example of Arrangement of Enlargement Processing Unit (Resolution Converter) in Image Processing According to Second Embodiment>

Since a feature of the second embodiment is setting of the initial phase, the arrangement of a reference pixel position control unit 109 in FIG. 1A described in the first embodiment is different. However, the remaining arrangement such as an image data calculation unit 103 is the same and a repetitive description thereof will be omitted.

(Example of Arrangement of Reference Pixel Position Control Unit 109 According to Second Embodiment)

Figure 11:
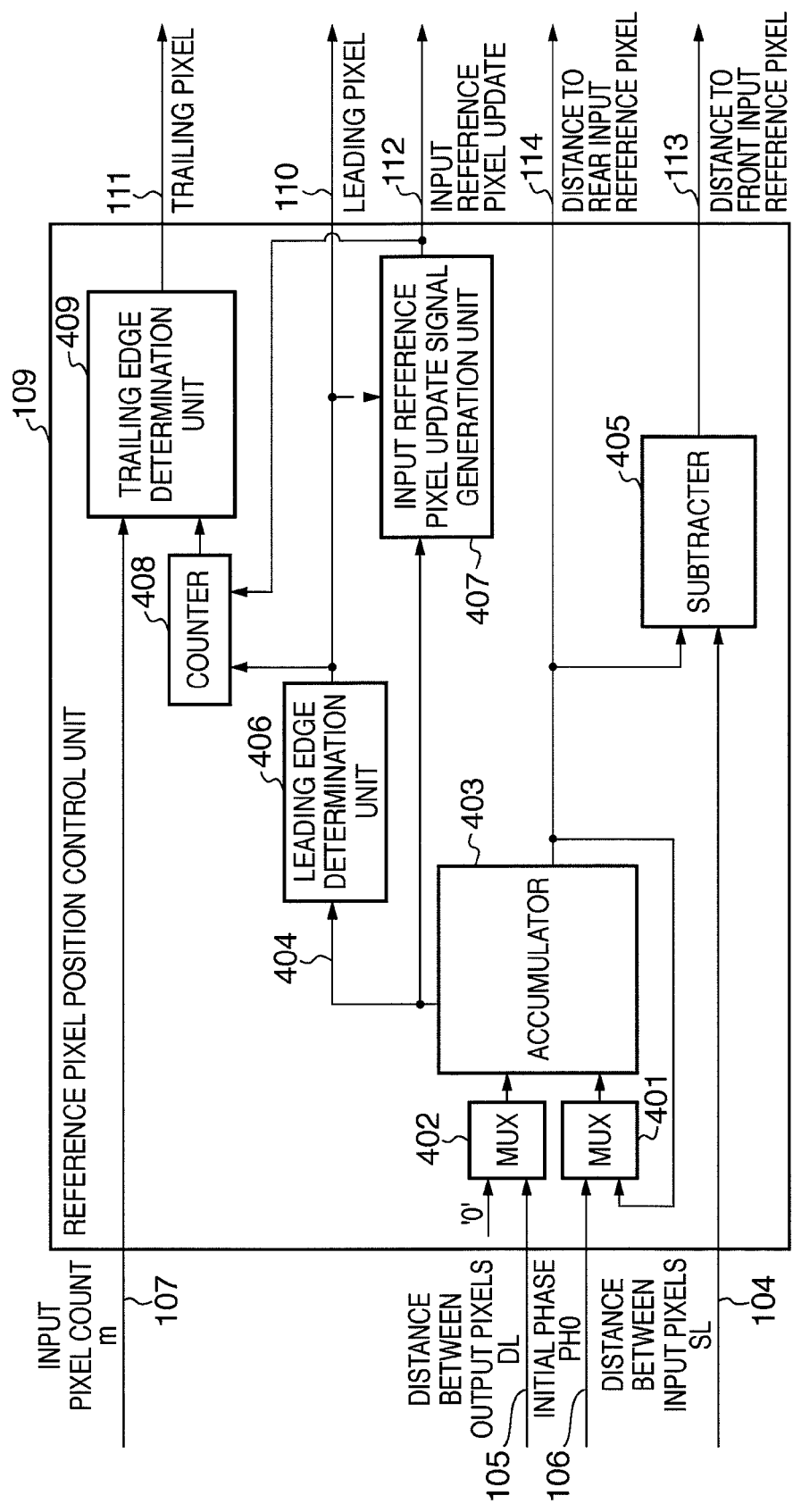
FIG. 11 is a block diagram exemplifying the arrangement of a reference pixel position control unit in the second embodiment.

FIG. 11 is a block diagram exemplifying the arrangement of the reference pixel position control unit 109 in the second embodiment. In FIG. 11, the same reference numerals as those in FIG. 2 denote the same input/output signals as those in FIG. 2.

In FIG. 11, reference numerals 401 and 402 denote selectors (to be referred to as a MUX 401 and MUX 402). An accumulator 403 accumulates the output values of the MUXs 401 and 402. Inputs to the MUX 401 are a value (PH0: to be referred to as an initial phase) held in an initial phase holding unit 106 and an output from the accumulator 403. The MUX 401 outputs an initial phase in calculation of the first output pixel in enlargement processing, and after that, selects an output from the accumulator 403. Inputs to the MUX 402 are a value held in a coefficient specifying magnification holding unit 105 and a fixed value "0". The MUX 402 outputs the fixed value "0" in calculation of the first output pixel in enlargement processing, and then, outputs a value held in the coefficient specifying magnification holding unit 105.

The accumulator 403 outputs a carry signal 404. The carry signal 404 is output when the sum of outputs from the MUXs 401 and 402 exceeds the bit count of the accumulator 403. A subtracter 405 calculates the difference between the value held in a coefficient between reference pixels holding unit 104 and the output value of the accumulator 403.

Similar to the first embodiment in FIG. 2, the reference pixel position control unit 109 operates in synchronism with a control signal 115 output from the image data calculation unit 103. In response to input of the control signal 115 from the image data calculation unit 103, the reference pixel position control unit 109 outputs control signals and calculation coefficients necessary for calculation processing by the image data calculation unit 103.

The calculation output of the accumulator 403 is output as a calculation coefficient 114. The calculation coefficient 114 represents the distance between the output pixel position and the first input pixel position out of two input reference pixels referred to in calculation of an output pixel. The calculation output of the subtracter 405 is output as a calculation coefficient 113. The calculation coefficient 113 represents the distance between the output pixel position and the second input pixel position out of two input reference pixels referred to in calculation of an output pixel. When configuring arithmetic units, it is known that a subtracter is formed from an adder. Thus, even when the subtracter 405 is configured as an adder, the adder corresponds to a subtracter.

A leading edge determination unit 406 operates in accordance with the carry signal 404 output from the accumulator 403, and outputs a leading pixel determination result signal 110. The concrete operation of the leading edge determination unit 406 will be described later. When the image data calculation unit 103 calculates an output pixel, an input reference pixel update signal generation unit 407 controls whether to update an input reference pixel read out from an image data storage unit 102. The input reference pixel update signal generation unit 407 generates a control signal 112 for updating an input reference pixel, in accordance with the carry signal 404 output from the accumulator 403 and the determination signal 110 output from the leading edge determination unit 406. A counter 408 counts the control signal 112 output from the input reference pixel update signal generation unit 407 in accordance with a value indicated by the leading pixel determination result signal 110 output from the leading edge determination unit 406. More specifically, the counter 408 does not count the control signal 112 if the leading pixel determination result signal 110 does not exhibit a level valid for counting. That is, the leading pixel determination result signal 110 functions as an operation control signal (enable signal) for the counter 408.

A trailing edge determination unit 409 determines a trailing edge in accordance with the output signal of the counter 408 and a value held in a input pixel count holding unit 107. The output value of the counter 408 indicates a count at which the input reference pixel has been updated after the leading edge determination unit 406 determines a leading pixel when calculating an output pixel. Hence, if the value held in the input pixel count holding unit 107 coincides with the output value of the counter 408, the trailing edge determination unit 409 determines that no input pixel can be updated any more, and outputs a trailing pixel determination signal 111. The concrete operation of the trailing edge determination unit 409 will be described as well as that of the leading edge determination unit 406.

As is apparent from this arrangement, the second embodiment is different from the first embodiment in three points. First, the carry signal 404 output from the accumulator 403 is input to the input reference pixel update signal generation unit 407. Second, the output calculation result of the accumulator 403 is output as the calculation coefficient 114. Finally, an output from the subtracter 405 is directly output as the calculation coefficient 113. That is, the absolute value output controllers 207 and 208 in the first embodiment do not exist as building components. The second embodiment can therefore simplify building components as compared with the first embodiment.

<Example of Processing When Enlarging Image at 2.5-magnification According to Second Embodiment>

The second embodiment will be explained in more detail by referring to a concrete pixel arrangement view.

(Concept in 2.5-Magnification Enlargement)

Figure 12:
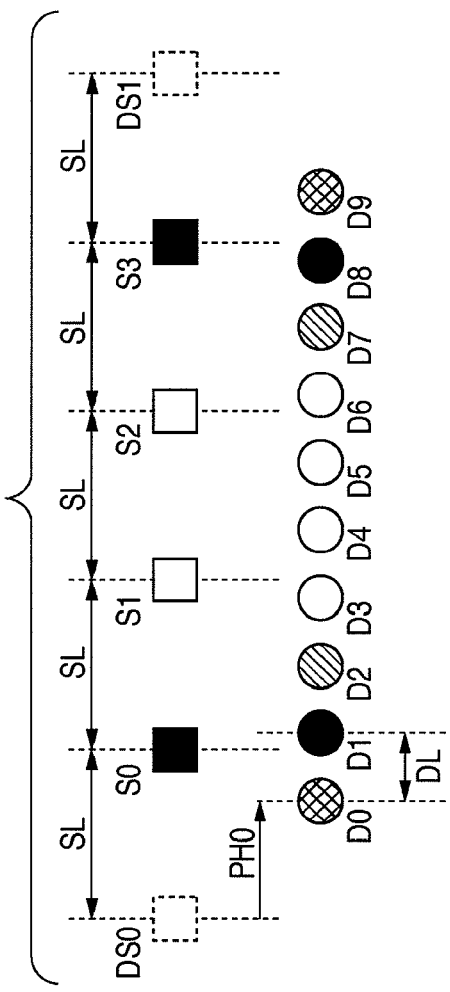
FIG. 12 is a view for explaining 2.5-magnification enlargement processing and initial phase setting in the second embodiment.

FIG. 12 is a view showing one-dimensional enlargement processing for explaining the concept of the second embodiment.

In FIG. 12, quadrangles S0 to S3 in solid lines represent input pixel positions, quadrangles DS0 and DS1 in dotted lines represent virtual pixel positions, and circles D0 to D9 represent output pixel positions. Both input and output pixels indicate the internal density levels of pixel data. A black quadrangle represents a black pixel (high density), and a white quadrangle represents a white pixel (low density). SL represents the distance between constituent pixels of an input image. DL represents the distance between constituent pixels of an output image.

Figure 14:
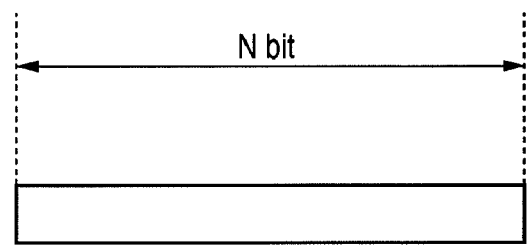
FIG. 14 is a view exemplifying the format of initial phase setting in the second embodiment.

In the second embodiment, unlike the first embodiment, virtual pixel data is arranged before the first pixel data S0 of an input image, and the initial phase PH0 is defined using the virtual pixel data position as a reference. In other words, a value set as the initial phase is not negative. A value set in the initial phase holding unit 106 is always positive and has a format shown in FIG. 14. In FIG. 14, the value of a bit count N set as the initial phase is directly linked to the calculation accuracy in linear interpolation calculation. A larger N value leads to higher accuracy. Since the initial phase setting value is always positive, no absolute value controller exists on the output stage of the accumulator 403. Hence, a calculation output from the accumulator 403 and an output from the subtracter 405 serve as calculation coefficients.

(Example of Concrete Processing in 2.5-Magnification Enlargement)

Figure 13:
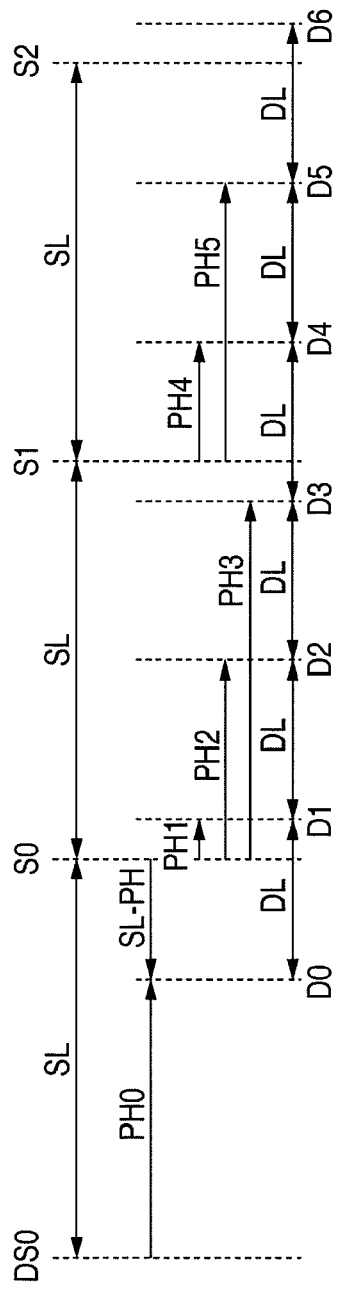
FIG. 13 is a view showing a phase corresponding to an output pixel position in the second embodiment.

FIG. 13 is a view showing the virtual pixel position DS0 at the leading edge, the three pixel positions S0, S1, and S2 from the start of input image data, and the phase states of the seven pixel positions D0 to D6 from the start of output image data. In FIG. 13, the same reference numerals as those in FIG. 12 have the same meanings.

According to the present invention, the initial phase PH0 set when enlarging four pixels of input image data at 2.5-magnification and outputting the enlarged image data is calculated from the distance SL between constituent pixels of input image data and the distance DL between constituent pixels of output image data, in order to keep horizontal symmetry of output image data after enlargement processing, similar to the first embodiment. To maintain horizontal symmetry of output image data, it suffices to shift the phase data with respect to the right and left ends of the input image data by half the difference between a distance corresponding to all pixels which form output image data and that corresponding to all pixels which form input image data.

In this example, the distance SL between constituent pixels of input image data is assumed to be "256", which is an exponentiation with a base of 2. Then, the distance DL between constituent pixels of output image data is "102", like the first embodiment. Since there are four input pixels, a distance corresponding to all pixels which form the input image data is given by equation (11).

$$SL \times (\text{number of pixels of input image data}-1) = 256 \times 3 = 768 \quad (11)$$

Since the distance DL between constituent pixels of output image data is given by 10 pixels, a distance corresponding to all pixels which form the output image data is calculated by equation (12).

$$DL \times (\text{number of pixels of output image data}-1) = 102 \times 9 = 918 \quad (12)$$

From this, the difference between the distance corresponding to all pixels which form the input image data and that corresponding to all pixels which form the output image data is given by equation (13)

$$918 - 768 = 150 \quad (13)$$

To maintain horizontal symmetry, it suffices to shift the phase by only half the value derived from equation (13) in a negative direction with respect to the first pixel which forms the input image data. In the first embodiment, the sign of the set initial phase is negative because the first input pixel is used as a reference. In the second embodiment, a virtual pixel before the first input pixel is used as a reference. Thus, calculation is done based on the distance SL between constituent pixels of an input image. That is, half the value derived from equation (12) is subtracted from SL. The initial phase set in the initial phase holding unit 106 is "181" in decimal notation. Since SL is "256", N in FIG. 14 is "8" in accordance with the initial phase format in FIG. 14. The initial phase PH is therefore set to "181 (0xB5)".

(Calculation Processing of First Output Pixel D0)

The image data calculation unit 103 outputs the control signal 115 to the reference pixel position control unit 109 as a request for control signals and calculation coefficients necessary in output pixel calculation. Upon receiving the control signal 115 from the image data calculation unit 103, the reference pixel position control unit 109 outputs control signals and calculation coefficients such as a leading pixel determination signal and trailing pixel determination signal. In calculation of the first pixel of the output image, inputs to the accumulator 403, that is, outputs from the MUXs 401 and 402 are the initial phase PH0 and the fixed value "0", respectively. The value "−181" of the initial phase PH0 is output as the calculation coefficient 114 from the reference pixel position control unit 109.

The subtracter 405 calculates the difference between an output from the accumulator 403 and a value held in the coefficient between reference pixels holding unit 104. The subtracter 405 then outputs the calculation coefficient 113. More specifically, the subtracter 405 outputs "75 (0x4B)" obtained by subtracting "181" from "256" which is the distance SL between constituent pixels of input image data.

When calculating the first pixel of the output image, an output from the accumulator 403 does not generate a carry, as described above. The carry signal 404 is not output, and thus none of the control signals 110, 111, and 112 are output at a significant level. Upon receiving the control signal 115, the reference pixel position control unit 109 outputs the control signals and calculation coefficients. At a timing when the output is at a significant level, the reference pixel position control unit 109 outputs a control signal 116 to the image data calculation unit 103. In this example, the reference pixel position control unit 109 outputs the control signal 116 at a timing when "75 (0x4B)" and "181 (0xB5)" are output as the calculation coefficients 113 and 114, respectively.

Upon receiving the control signal 116, the image data calculation unit 103 outputs, to the image data storage unit 102 for output pixel calculation, a control signal 117 serving as a request signal of input image data 118 and 119. Upon receiving the control signal 117, the image data storage unit 102 outputs stored image data. More specifically, the image data storage unit 102 outputs the first input pixel data S0 as the image signal 118 and the second input pixel data S1 as the image signal 119.

The image data calculation unit 103 calculates an output pixel using the control signals and calculation coefficients output from the reference pixel position control unit 109 and the image data 118 and 119 output from the image data storage unit 102. In calculation of the first output pixel D0, none of the control signals 110, 111, and 112 are at a significant level at the timing when the reference pixel position control unit 109 outputs the control signal 116.

If the control signal 111 is not output from the trailing edge determination unit 409, a MUX 303 in the image data calculation unit 103 in FIG. 3 outputs the input image data 118. If the control signal 110 is not output from the leading edge determination unit 406, a MUX 306 outputs a value held in a virtual pixel value holding unit 305. Accordingly, a multiplier 307 multiplies the image data 118 serving as the first pixel data of the input image and the calculation coefficient 114 ("0xB5"). A multiplier 308 multiplies the value held in the virtual pixel value holding unit 305 and the calculation coefficient 113 ("0x4B"). An adder 309 adds the products from the multipliers 307 and 308, and a divider 310 divides the sum. In this description, since the distance SL between constituent pixels of the input image data is an exponentiation with a base of 2 ("256"), the calculation of the divider 310 can be achieved by an 8-bit shift. An output from the divider 310, that is, the first pixel D0 of the output image is given by equation (14).

$$D0=(S0\times\text{``}0xB5\text{''}+DS0\times\text{``}0x4B\text{''})/\text{``}0x100\text{''} \qquad (14)$$

In the input pixel arrangement shown in FIG. 12, the S0 value represents black ("0x00") and the DS0 value represents white ("0xFF"). The S0 and DS0 values are substituted into equation (14), obtaining "74 (0x4A)".

(Calculation Processing of Second Output Pixel D1)

Calculation of the second output pixel D1 will be explained. The image data calculation unit 103 outputs the control signal 115 to calculate the second output pixel D1. Then, the reference pixel position control unit 109 outputs control signals, and calculation coefficients necessary for calculation of the second pixel of the output image. When the image data calculation unit 103 outputs the control signal 115 to calculate the second output pixel, the reference pixel position control unit 109 outputs control signals and the calculation coefficients 113 and 114 corresponding to this pixel.

Because of calculation of the second output pixel, an output from the MUX 401 is not a value held in the initial phase holding unit 106 but "181 (0xB5)" serving as an output from the accumulator 403. In contrast, an output from the MUX 402 is switched from the fixed value "0" to a value held in the coefficient specifying magnification holding unit 105. As a result, the MUX 402 outputs "102 (0x66)" serving as the value of the distance DL between constituent pixels of the output image data that corresponds to the set magnification.

The accumulator 403 adds the values of the MUXs 401 and 402. Since the output from the MUX 401 is "0xB5" and that from the MUX 402 is "0x66", the output from the accumulator 403 is "0x11B". In this case, the accumulator 403 outputs the carry signal 404 at a significant level, and the value of lower 8 bits is "0x1B". The calculation coefficients 114 and 113 are output as "27 (0x1B)" and "229 (0xE5)", respectively. These values indicate the phase of the second output pixel D1 in FIG. 13. PH1 in FIG. 13 corresponds to the output value "0x1B" of the calculation coefficient 114. After PH1 is determined, the distance from the image data 119 of the input reference pixel S1 to the second output pixel D1 is attained by subtracting PH1 from the distance SL between constituent pixels of input image data. This distance corresponds to the output value "0xE5" of the calculation coefficient 113.

Since the accumulator 403 outputs the carry signal 404, the leading edge determination unit 406 determines a leading pixel. The determination processing of the leading edge determination unit 406 is to output the leading pixel determination signal 110 upon receiving the carry signal 404.

The input reference pixel update signal generation unit 407 outputs the control signal 112 based on the carry signal 404. However, the input reference pixel update signal generation unit 407 does not output the control signal 112 until the leading edge determination unit 406 outputs the control signal 110. In calculation of the second output pixel D1, the leading edge determination unit 406 outputs the control signal 110 at a significant level. At this timing, the input reference pixel update signal generation unit 407 does not output the control signal 112 regardless of the carry signal 404 owing to synchronous control.

Similar to calculation of the first output pixel, the reference pixel position control unit 109 outputs control signals and calculation coefficients. At the output timing, the reference pixel position control unit 109 outputs the control signal 116 to the image data calculation unit 103. Upon receiving the control signal 116, the image data calculation unit 103 starts calculating output image data. When the reference pixel position control unit 109 outputs the control signal 116, neither the control signal 110 nor 112 has been output, so no input pixel data is updated. That is, data in data holding units 301 and 302 are not updated.

Even when neither the data holding unit 301 nor 302 is updated, the image data calculation unit 103 may output the control signal 117. For example, the same data as that in calculation of the first output pixel may be received by setting the memory address in the image data storage unit 102 to the same value. It is also possible not to output the control signal 117 when the reference pixel position control unit 109 does not output the control signal 112 indicating update of an input reference pixel.

The image data calculation unit 103 calculates the second output pixel data D1 based on the control signals and calculation coefficients 113 and 114 output from the reference pixel position control unit 109. More specifically, the leading edge determination unit 406 outputs the control signal 110 at a significant level, and the output of the MUX 306 is switched to the image data 119. Since the trailing edge determination unit 409 does not output the control signal 111, the MUX 303 outputs the image data 118. The multiplier 307 multiplies the calculation coefficient 114 and the image data 118 (S0) output from the MUX 303. The multiplier 308 multiplies the calculation coefficient 113 and the image data 119 (S1) output from the MUX 306. Similar to calculation of the first output pixel, the adder 309 adds the output values of the multipliers 307 and 308, and the divider 310 divides the sum.

(Calculation Processing of Third Output Pixel D2)

Calculation of the third output pixel D2 of the output image will be explained. Similar to calculation of the second output pixel D1, the image data calculation unit 103 outputs the control signal 115 to the reference pixel position control unit 109. Upon receiving the control signal 115 from the image data calculation unit 103, the reference pixel position control unit 109 outputs control signals and the calculation coefficients 113 and 114 for calculation of the third output pixel D2.

The calculation coefficient 113 is obtained based on an output from the accumulator 403 in calculation of the second output pixel. An output from the MUX 401 is an output from the accumulator 403 in calculation of the second output pixel. An output from the MUX 402 is a value held in the coefficient specifying magnification holding unit 105. The accumulator 403 adds the output values of the MUXs 401 and 402. More specifically, the accumulator 403 adds "27 (0x1B)" output from the MUX 401 and "102 (0x66)" output from the MUX 402, and outputs "129 (0x81)". The output value of the accumulator 403 at this time is determined, so the subtraction value of the subtracter 405 is determined to be "127 (0x7F)". These values indicate the phase of the third output pixel D2 in FIG. 13. This phase corresponds to PH2 in FIG. 13. After PH2 is determined, the distance from the image data 119 of the input reference pixel S1 to the third output pixel D2 is attained by subtracting PH2 from the distance SL between constituent pixels of input image data.

The image data calculation unit 103 calculates the third output pixel D2 based on the control signals and calculation coefficients 113 and 114 output from the reference pixel position control unit 109. More specifically, the leading edge determination unit 406 outputs the control signal 110 at a significant level, and the output of the MUX 306 is switched to the image data 119. Since the trailing edge determination unit 409 does not output the control signal 111, the MUX 303 outputs the image data 118. The multiplier 307 multiplies the calculation coefficient 114 ("127") and the image data 118 (S0) output from the MUX 303. The multiplier 308 multiplies the calculation coefficient 113 ("129") and the image data 119 (S1) output from the MUX 306. Similar to calculation of the first and output second pixels, the adder 309 adds the output values of the multipliers 307 and 308, and the divider 310 divides the sum.

(Calculation Processing of Fourth Output Pixel D3)

Calculation of the fourth output pixel D3 will be explained. Similar to calculation of the third output pixel D2, the image data calculation unit 103 outputs the control signal 115 to the reference pixel position control unit 109. Upon receiving the control signal 115 from the image data calculation unit 103, the reference pixel position control unit 109 outputs control signals and the calculation coefficients 113 and 114 for calculation of the fourth output pixel D3.

The calculation coefficient 113 is obtained based on an output from the accumulator 403 in calculation of the third output pixel. An output from the MUX 401 is an output from the accumulator 403 in calculation of the third output pixel. An output from the MUX 402 is a value held in the coefficient specifying magnification holding unit 105. The accumulator 403 adds the output values of the MUXs 401 and 402. More specifically, the accumulator 403 adds "129 (0x81)" output from the MUX 401 and "102 (0x66)" output from the MUX 402, and outputs "231 (0xE7)". The output value of the accumulator 403 at this time is determined, so the subtraction value of the subtracter 405 is determined to be "25 (0x19)". These values indicate the phase of the fourth output pixel D3 in FIG. 13. This phase corresponds to PH3 in FIG. 13. After PH3 is determined, the distance from the image data 119 of the input reference pixel S1 to the fourth output pixel D3 is attained by subtracting PH3 from the distance SL between constituent pixels of input image data.

The image data calculation unit 103 calculates the fourth output pixel D3 based on the control signals and calculation coefficients 113 and 114 output from the reference pixel position control unit 109. More specifically, the leading edge determination unit 406 outputs the control signal 110 at a significant level, and the output of the MUX 306 is switched to the image data 119. Since the trailing edge determination unit 409 does not output the control signal 111, the MUX 303 outputs the image data 118. The multiplier 307 multiplies the calculation coefficient 114 ("25") and the image data 118 (S0) output from the MUX 303. The multiplier 308 multiplies the calculation coefficient 113 ("231") and the image data 119 (S1) output from the MUX 306. Similar to the front output pixel calculation, the adder 309 adds the output values of the multipliers 307 and 308, and the divider 310 divides the sum.

(Calculation Processing of Fifth Output Pixel D4)

Calculation of the fifth output pixel D4 will be explained. Similar to calculation of the fourth output pixel D3, the image data calculation unit 103 outputs the control signal 115 to the reference pixel position control unit 109. Upon receiving the control signal 115 from the image data calculation unit 103, the reference pixel position control unit 109 outputs control signals and the calculation coefficients 113 and 114 for calculation of the fifth output pixel D4.

The calculation coefficient 113 is obtained based on an output from the accumulator 403 in calculation of the fourth output pixel. An output from the MUX 401 is an output from the accumulator 403 in calculation of the fourth output pixel. An output from the MUX 402 is a value held in the coefficient specifying magnification holding unit 105. The accumulator 403 adds the output values of the MUXs 401 and 402. More specifically, the accumulator 403 adds "231 (0xE7)" output from the MUX 401 and "102 (0x66)" output from the MUX 402, and outputs the sum "333 (0x14D)".

As a result of the addition by the accumulator 403 in calculation of the fifth output pixel, the accumulator 403 generates a carry. This means output of the carry signal 404 to the input reference pixel update signal generation unit 407. The control signal 110, which is an output from the leading edge determination unit 406, has been output in calculation of the second output pixel. The input reference pixel update signal generation unit 407 outputs the carry signal 404 as the control signal 112. In calculation of the fifth output pixel, therefore, the control signals 110 and 112 and the two calculation coefficients are output at a significant level at the timing when the control signal 116 is output.

Upon receiving the control signals and two calculation coefficients from the reference pixel position control unit 109, the image data calculation unit 103 starts calculation processing of the fifth output pixel. Note that the control signal 112 has been output in calculation of the fifth output pixel, unlike the front output pixel calculation. The control signal 112 represents update of the input reference pixel. Thus, the image data calculation unit 103 updates input image data held in the data holding units 301 and 302.

Update of input image data is done based on the control signal 117 output from the image data calculation unit 103 to the image data storage unit 102. Upon receiving the control signal 117 from the image data calculation unit 103 to designate update of the input reference pixel, the image data storage unit 102 outputs the image data 118 and 119. After the input reference pixel data is updated, the image data 118 indicates the second input pixel S1 and the image data 119 indicates the third input pixel S2. The data holding unit 301 of the image data calculation unit 103 holds the image data 118 (S1), and the data holding unit 302 holds the image data 119 (S2).

In calculation of the fifth output pixel, the calculation coefficient 113 is the calculation result of the accumulator 403. That is, a value obtained by subtracting "256" upon generation of a carry, i.e., the sum "77 (0x4D)" is output. This value indicates a phase PH4 in FIG. 13 from the second input pixel S1 to the fifth output pixel D4. After PH4 is determined, the distance from the third input pixel S2 to the fifth output pixel D4 is attained by subtracting PH4 from SL. This distance corresponds to an output from the subtracter 405 and is "179 (0xB3)".

The image data calculation unit 103 calculates the fifth output pixel data D4 based on the control signals and calculation coefficients 113 and 114 output from the reference pixel position control unit 109. More specifically, the leading edge determination unit 406 outputs the control signal 110 at a significant level, and the output of the MUX 306 is switched to the image data 119. Since the trailing edge determination unit 409 does not output the control signal 111, the MUX 303 outputs the image data 118. The multiplier 307 multiplies the calculation coefficient 114 ("179") and the image data 118 (S1) output from the MUX 303. The multiplier 308 multiplies the calculation coefficient 113 ("77") and the image data 119 (S2) output from the MUX 306. Similar to the front output pixel calculation, the adder 309 adds the output values of the multipliers 307 and 308, and the divider 310 divides the sum.

In this manner, update of the input reference pixel is controlled using the calculation result of the accumulator 403. The phase between the input reference pixel position and the output pixel position is output as a calculation coefficient. The image data calculation unit 103 can calculate an output pixel value.

(Calculation Processing of 10th Output Pixel D9)

Output of the control signal 111 of the trailing edge determination unit 409 will be explained. The input reference pixel update signal generation unit 407 outputs the control signal 112 in accordance with the carry of the accumulator 403. The counter 408 counts control signals 112 after the leading edge determination unit 406 outputs the control signal 110. In this description, there are four input pixels, so the counter 408 executes counting up to "4". The trailing edge determination unit 409 compares the output value of the counter 408 with a value held in the input pixel count holding unit 107. If these values match each other, the trailing edge determination unit 409 outputs the control signal 111.

In four update operations of input reference pixel data, the data holding units 301 and 302 in the image data calculation unit 103 update held data every update. In this example, the data holding unit 302 holds the fourth input pixel data S3 after the four update operations. Since data held in the data holding unit 301 at this time does not exist in input pixels, the data holding unit 301 holds data before update or invalid data.

After the control signal 111 is output, the MUX 303 in the image data calculation unit 103 is switched. As a result, not data held in the data holding unit 301 but data held in the virtual pixel value holding unit 302 is output as an output from the MUX 303.

In accordance with the control signal 110 output from the leading edge determination unit 406, the MUX 306 outputs a value held in the data holding unit 304. The multiplier 307 multiplies the output from the MUX 303, that is, the value held in the virtual pixel value holding unit 302 and the calculation coefficient 114 output from the reference pixel position control unit 109 at that time. Similarly, the multiplier 308 multiplies the output from the MUX 306, that is, the value held in the data holding unit 304 and the calculation coefficient 113 output from the reference pixel position control unit 109 at that time.

Since the initial phase is set using a virtual pixel before the first input pixel as a reference, the calculation coefficients 113 and 114 at the trailing edge of output image data do not shift the phase horizontally asymmetrically with respect to the input image data position. That is, even the calculation coefficients 113 and 114 at the trailing edge of output image data exhibit a phase appropriate for maintaining horizontal symmetry.

Consequently, the input image of the four pixels S0 to S3 in which the pixels at right and left ends are black is horizontally symmetrically enlarged at 2.5-magnification (D0 to D9), as shown in FIG. 12. As is also apparent from FIG. 12, enlargement processing can be achieved while keeping the symmetry of an input image, by setting the initial phase using a virtual pixel before the first input pixel as a reference.

Whether to end enlargement processing is determined based on the number of pixels output from the image data calculation unit 103 and data held in a output pixel count holding unit 108 that is set by the CPU. More specifically, the value of a counter for counting the output pixel count is compared with data held in the output pixel count holding unit 108. When the output pixel count reaches the held value, the enlargement processing is completed.

<Example of Processing When Enlarging Image at 2.0-Magnification According to Second Embodiment>

The example of processing when enlarging an image at 2.5-magnification has been described in detail with reference to FIGS. 12 to 14.

Figure 15:
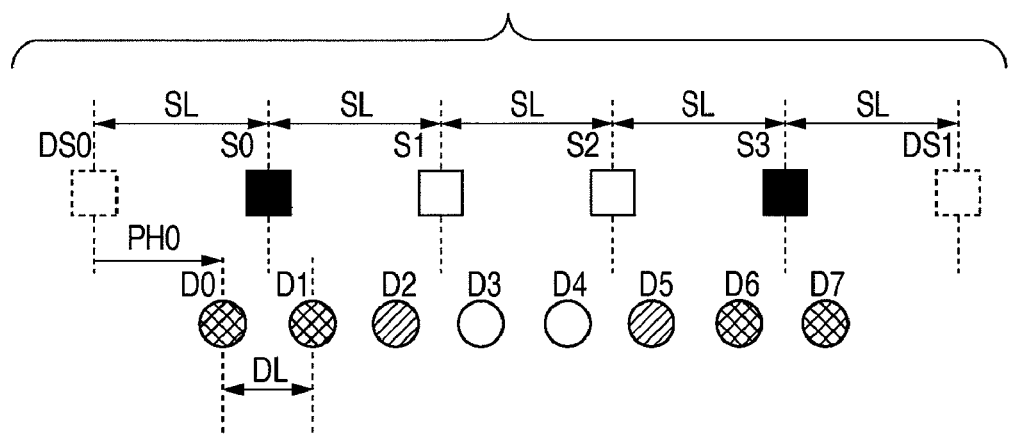
FIG. 15 is a view for explaining 2.0-magnification enlargement processing and initial phase setting in the second embodiment.

FIG. 15 exemplifies processing when enlarging an image at 2.0-magnification.

In the example of FIG. 15, the basic operation is the same as that of the 2.5-magnification enlargement processing except that the distance DL between output pixels is half the distance SL between input pixels and the initial phase PH0 is SL–DL/2.

According to the arrangements of FIGS. 1A, 1B, 11, and 3 in the second embodiment, virtual pixels DS0 and DS1 are arranged outside the two, left and right ends based on input pixel data S0 to S3. A positive initial phase PH0 from the virtual pixel DS0 is set. Then, output pixel data D0 to D7 are linearly interpolated based on distances from the input pixel data S0 to S3 and virtual pixels DS0 and DS1 which sandwich the output pixel data D0 to D7. As a result, a 2.0-magnification-enlarged (resolution-converted) image made up of the high-quality output pixel data D0 to D7 which keep symmetry can be provided.

<Example of Application of Second Embodiment to Two-Dimensional Image in Enlargement (Resolution Conversion)>

For descriptive convenience, one-dimensional image data has been explained. However, the second embodiment is also applicable to two-dimensional image data.

Figure 16:
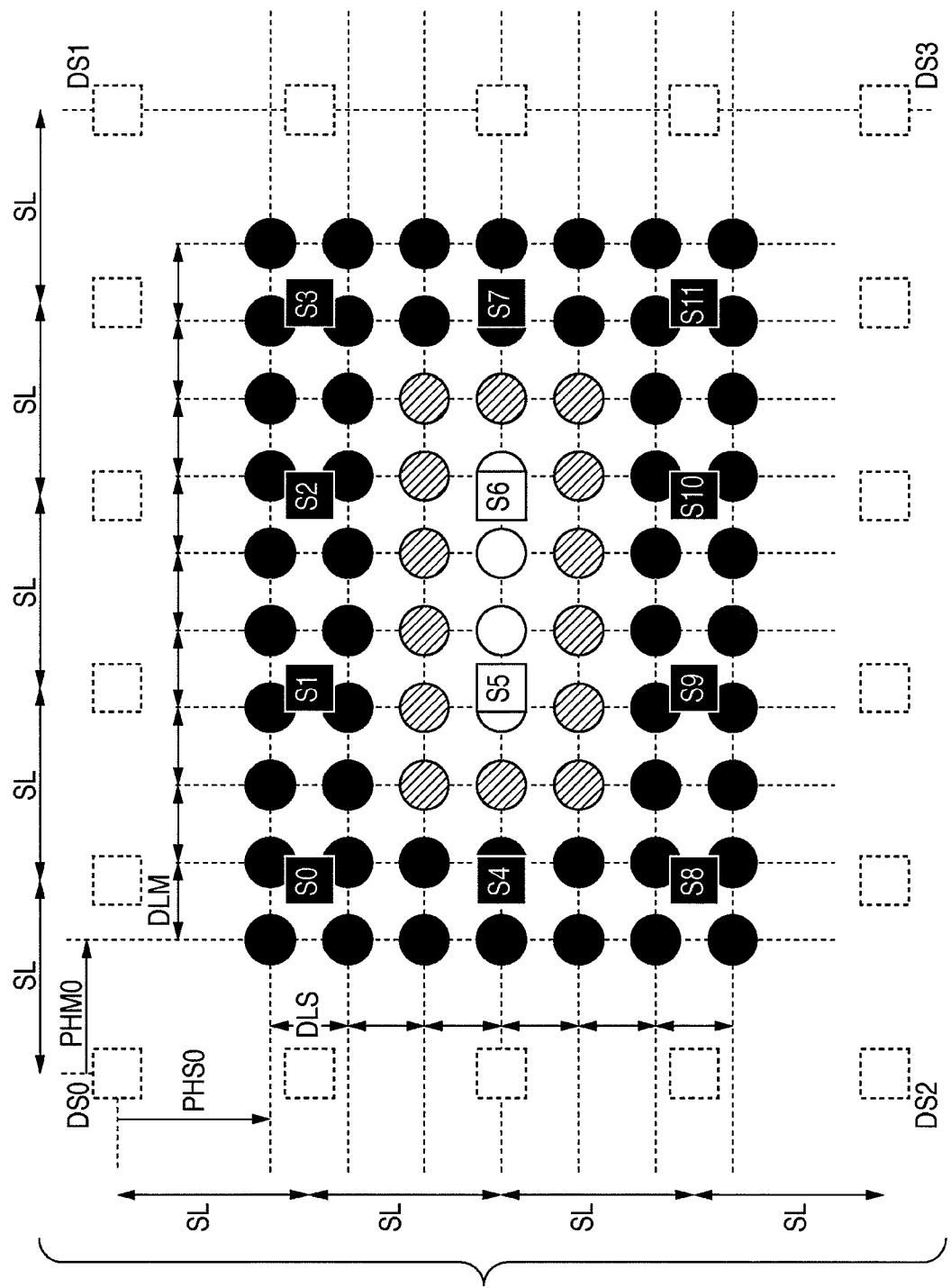
FIG. 16 is a view exemplifying an application of enlargement processing of the second embodiment to two-dimensional image data.

FIG. 16 is a conceptual view showing an application of the present invention to two-dimensional image data.

In FIG. 16, quadrangles in solid lines represent pixel data S0 to S11 of an input image. The density of the quadrangle indicates a pixel level. A black quadrangle represents high density (black), and a white quadrangle represents low density (white). The input image is formed from a total of 12 pixels in which peripheral pixels S0 to S4 and S7 to S11 are black pixels and two center pixels S5 and S6 are white pixels. SL represents the distance between constituent pixels of an input image. DLM represents the distance between constituent pixels of an output image in the main scanning direction, and DLS represents the distance between constituent pixels in the sub-scanning direction. When the enlargement magnification is set to be equal between the main scanning direction and the sub-scanning direction, DLM and DLS have the same value. Quadrangles in dotted lines represent virtual pixel data DS0, DS1, DS2, and DS3. When the present invention is applied to image data, all virtual image data are often set to the same value.

Even when the present invention is applied to two-dimensional image data, the concept of setting initial phases in the main scanning direction and sub-scanning direction is the same as that for one-dimensional image data. That is, the initial phase is set to a value based on the number of pixels of input image data in the main scanning direction/sub-scanning direction, the number of pixels of output image data generated at an enlargement magnification in the main scanning direction/sub-scanning direction, and the distance between constituent pixels.

When the enlargement magnification is set to 2.5 in both the main scanning direction and sub-scanning direction in the example of FIG. 16, the output pixel count in the main scanning direction is 10 and that of pixels in the sub-scanning direction is 7. When the distance SL between constituent pixels of an input image is "256" which is an exponentiation with a base of 2, the distances DLM and DLS between constituent pixels of the output image are given by equation (15).

$$DLM(DLS) = SL/\text{enlargement magnification} \quad (15)$$
$$= 256/2.5 = 102$$

An output image having 10 pixels in the main scanning direction and seven pixels in the sub-scanning direction is obtained by enlarging at 2.5-magnification input image data having four pixels in the main scanning direction and three pixels in the sub-scanning direction. In this case, a distance corresponding to all pixels which form the input image in the main scanning direction is "768" according to equation (4). Similarly, a distance corresponding to all pixels which form the input image in the sub-scanning direction is "512". In contrast, a distance corresponding to all pixels which form the output image in the main scanning direction is "918" according to equation (5). Also, a distance corresponding to all pixels which form the output image in the sub-scanning direction is "612".

The difference between the distance corresponding to all pixels which form the input image data in the main scanning direction and that corresponding to all pixels which form the output image in the main scanning direction is given by equation (16). The difference between the distance corresponding to all pixels which form the input image data in the sub-scanning direction and that corresponding to all pixels which form the output image in the sub-scanning direction is given by equation (17).

918−768=150

612−512=100

The calculation results derived from equations (16) and (17) represent the difference between the distance corresponding to all pixels of the input image data and that corresponding to all pixels of the output image in the main scanning direction, and the difference between the distance corresponding to all pixels of the input image data and that corresponding to all pixels of the output image in the sub-scanning direction, respectively. Then, a value using virtual pixel data as a reference is obtained. More specifically, half the calculation results of equations (16) and (17) are subtracted from the distance SL between constituent pixels of the input image.

Accordingly, initial phase values are set to "181" in a main scanning direction PHM and "206" in a sub-scanning direction PHS. In the second embodiment, even when the enlargement magnification is equal between the main scanning direction and the sub-scanning direction in an input image having different numbers of pixels in the main scanning direction and sub-scanning direction, different initial phase values are set in the respective directions.

When the present invention is applied to two-dimensional image data, the building components shown in FIG. 11 are arranged individually in the main scanning direction and sub-scanning direction. More specifically, accumulators, leading edge determination units, input reference pixel update signal generation units, counters, and trailing edge determination units are arranged and controlled independently in the respective directions in which pixels are formed. The leading edge determination unit and trailing edge determination unit for the main scanning direction clear control signals upon completion of inputting pixel data of one line and outputting corresponding output image data. That is, the control signals 110 and 111 function for each line. The leading edge determination unit and trailing edge determination unit for the sub-scanning direction clear control signals upon completion of inputting all input pixel data and outputting corresponding output image data.

<Example of Sequence of Image Enlargement (Resolution Conversion) Processing According to Second Embodiment>

Figure 17:
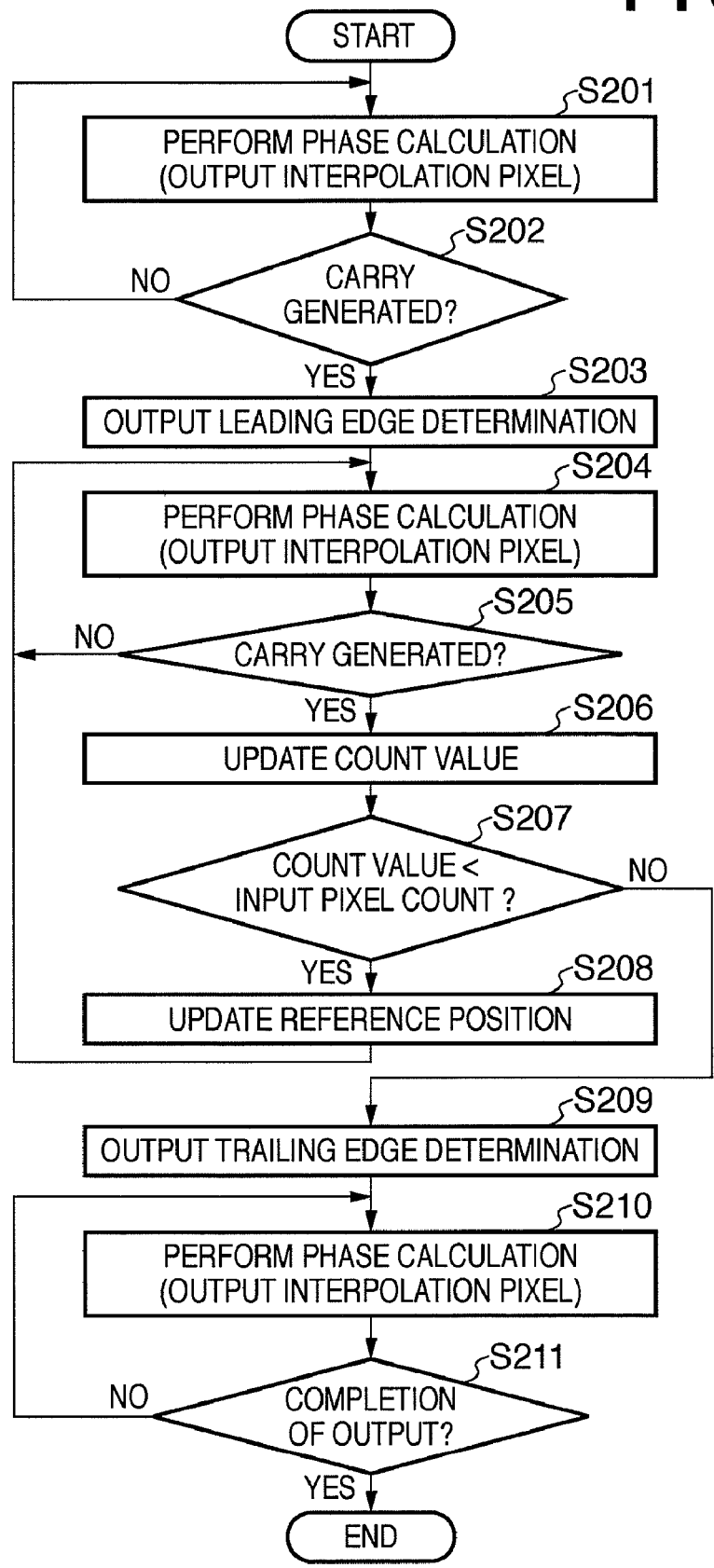
FIG. 17 is a flowchart exemplifying an operation sequence in the second embodiment.
Figure 18:
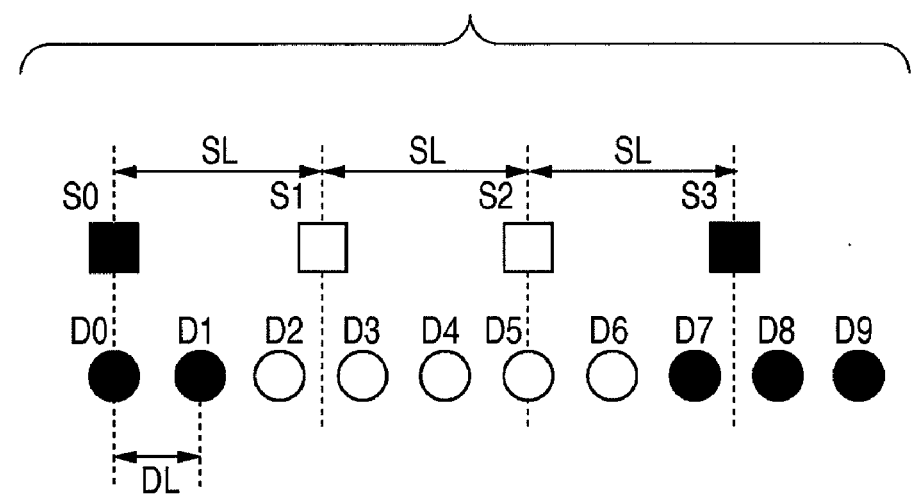
FIG. 18 is a view exemplifying enlargement processing by a conventional SPC method.
Figure 19:
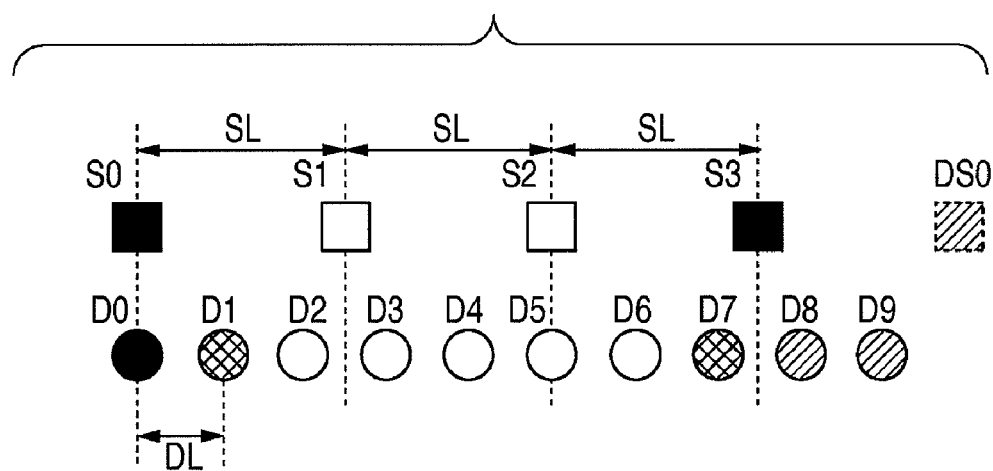
FIG. 19 is a view exemplifying enlargement processing by a conventional linear interpolation method.
Figure 20:
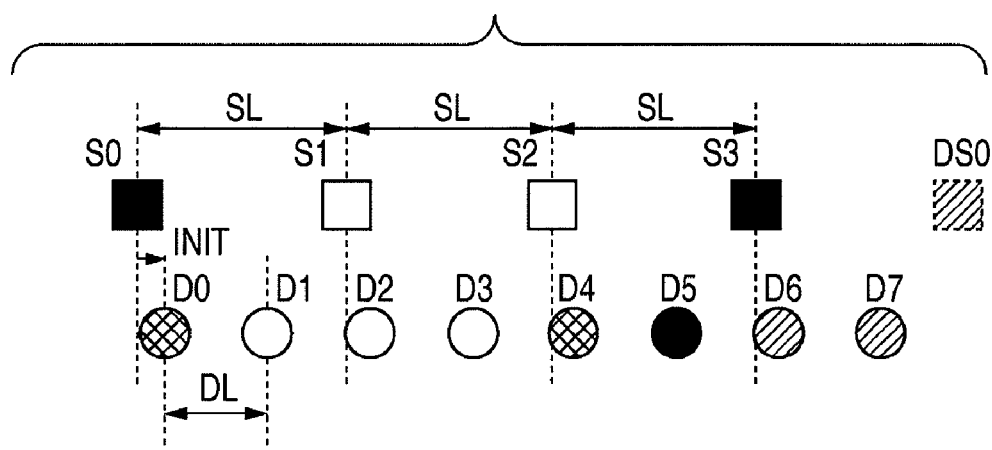
FIG. 20 is a view exemplifying enlargement processing when an initial phase is set in the conventional linear interpolation method.
Figure 21A:
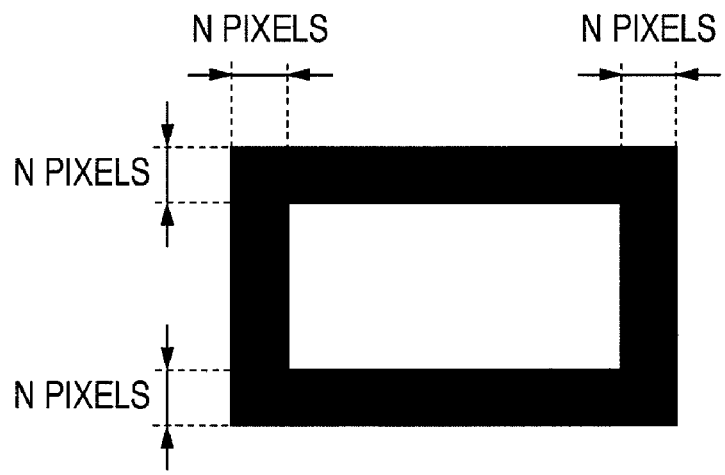
FIG. 21A is a view exemplifying an original image when the conventional linear interpolation method is applied to two-dimensional image data.
Figure 21B:
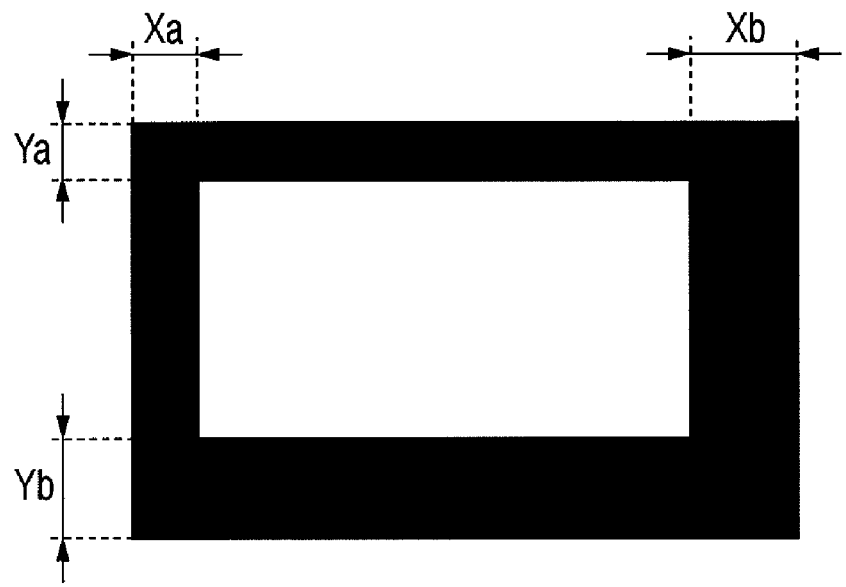
FIG. 21B is a view exemplifying an enlarged image having no initial phase when the conventional linear interpolation method is applied to two-dimensional image data.
Figure 21C:
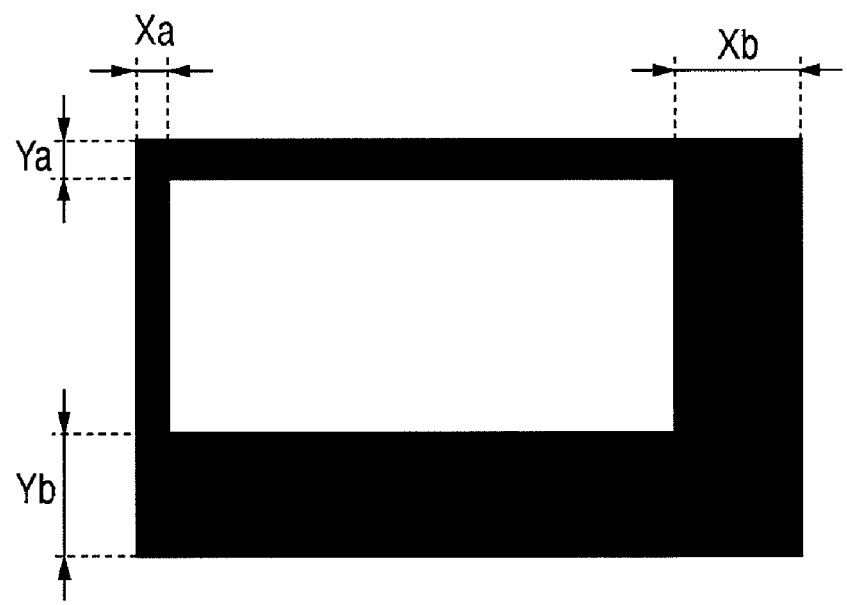
FIG. 21C is a view exemplifying an enlarged image having an initial phase when the conventional linear interpolation method is applied to two-dimensional image data.

FIG. 17 is a flowchart exemplifying the sequence of image enlargement (resolution conversion) processing according to the second embodiment. This processing is executed by a CPU (not shown) which controls or implements the functional blocks in FIGS. 1A, 1B, 11, and 3.

After determining the number of constituent pixels of input image data and the enlargement magnification, the CPU, which makes various settings of the apparatus in the embodiment, executes the following settings. More specifically, the CPU sets the coefficient between reference pixels holding unit 104, coefficient specifying magnification holding unit 105, initial phase holding unit 106, input pixel count holding unit 107, and output pixel count holding unit 108. Then, the CPU activates enlargement processing.

When the CPU activates the enlargement processing, each processing unit of the apparatus in the embodiment starts the enlargement processing. The image data calculation unit 103 requests the reference pixel position control unit 109 to generate various control signals and output calculation coefficients necessary for linear interpolation calculation. In response to the request, the reference pixel position control unit 109 executes phase calculation (step S201).

An initial phase is set using a virtual pixel before an input pixel as a reference. Thus, enlargement processing calculation is done for the first output pixel using the first input pixel data input from the image data storage unit 102, and a virtual pixel data value until the sum of accumulated distances between constituent pixels of output image data contains a carry (step S202).

After generating the first carry as an accumulated output, the leading edge determination unit 406 outputs the control signal 110 (step S203). After the leading edge determination unit 406 outputs the control signal 110, an output pixel is calculated using pixel data input from the image data storage unit 102 without using a virtual pixel data value. In the subsequent processing, the carry of the accumulated output is handled as an input reference pixel update signal.

The image data calculation unit 103 does not update the input reference pixel until the reference pixel position control unit 109 outputs an input reference pixel update signal. In other words, the image data calculation unit 103 repeats phase calculation to calculate an output pixel (steps S204 and S205). When the input reference pixel update signal is output, the image data calculation unit 103 updates the input pixel data used for calculation. Even after the update, the image data calculation unit 103 continuously executes phase calculation and output pixel calculation. More specifically, the image data calculation unit 103 receives input pixel data to be referred to next from the image data storage unit 102, and performs output pixel calculation.

The counter 408 counts the number of input reference pixel update signals generated after outputting the control signal 110 of the leading edge determination unit 406. The apparatus of the second embodiment repeats update of the input reference pixel, phase calculation, and output pixel calculation until the count value of the counter 408 reaches the input pixel count set by the CPU (steps S204 to S208).

If the count value of the counter 408 has reached the input pixel count set by the CPU, the trailing edge determination unit 409 outputs the trailing edge determination control signal 111 (step S209). Until the number of pixels output from the image data calculation unit 103 reaches a value set by the CPU, phase calculation and output pixel calculation are performed to output the last output pixel (steps S210 and S211). After the trailing edge determination unit 409 outputs the trailing edge determination control signal 111, output pixel calculation is done using the last input pixel data and virtual pixel data.

Also in the second embodiment, the image enlargement unit (resolution converter) can be implemented by a computer with the same arrangement as that in FIG. 10.

<Effects of Second Embodiment>

The apparatus according to the second embodiment uses virtual pixel data to execute linear interpolation calculation at the leading and trailing edges of pixel data which form an input image. A value as an initial phase is set not between the first and second pixels which form an input image, but between the virtual pixel and the first input pixel. The set value is calculated based on the difference between the distance between constituent pixels of input image data and that between constituent pixels of output image data. Unlike the first embodiment, the set value complies with an unsigned coefficient format and uses the carry of the accumulator. The arrangement of the arithmetic processing unit can be simplified more than the arrangement in the first embodiment. The second embodiment implements enlargement processing which keeps the symmetry of input image data.

Other Embodiments

The present invention may be applied to a system including a plurality of devices or an apparatus formed by a single device, like a scanner, printer, PC, copying apparatus, multifunction peripheral, or facsimile apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-011120, filed on Jan. 21, 2009, which is hereby incorporated by reference herein in its entirety.

What is claimed is:

1. An image enlargement apparatus for enlarging an input image by performing interpolation on input image data, comprising:

an arrangement unit configured to arrange virtual pixels, which are not included in the input image data, before a first pixel and after a last pixel in an input pixel array in at least one of horizontal and vertical directions of the input image to be enlarged;

a determination unit configured to determine a position in an output image of a first pixel in an output pixel array of output image data in accordance with an enlargement magnification so that a difference between a position in the input image of a first pixel in the input pixel array and a position in the output image of the first pixel in the output pixel array equals a difference between a position in the input image of a last pixel in the input pixel array and a position in the output image of a last pixel in the output pixel array; and a calculation unit configured to calculate pixel data of an output pixel at a position in the output image before the position in the input image of the first pixel in the input pixel array by performing interpolation based on pixel data of the virtual pixel arranged before the first pixel in the input pixel array and pixel data of the first pixel in the input pixel array, and calculate pixel data of an output pixel at a position in the output image after the position in the input image of the last pixel in the input pixel array by performing interpolation based on pixel data of the virtual pixel arranged after the last pixel in the input pixel array and pixel data of the last pixel in the input pixel array.

2. The apparatus according to claim 1, wherein said determination unit comprises:

a unit configured to calculate, based on the enlargement magnification, a value which determines a number of output pixels and a distance between pixels after calculation from a value which determines a number of input pixels and a distance between pixels before enlargement; and a unit configured to determine the position in the output image of the first pixel in the output pixel array from the value which determines the number of input pixels and the distance between pixels before enlargement and the calculated value which determines the number of output pixels and the distance between pixels after calculation.

3. The apparatus according to claim 1, wherein the pixel position is indicated by a phase representing a shift of a timing to form each pixel by an image forming unit which forms an image corresponding to image data, and an initial phase is defined by the difference between the position in the input image of the first pixel in the input pixel array and the position in the output image of the first pixel in the output pixel array, and said determination unit determines the position in the output image of the first pixel in the output pixel array as the initial phase from the position in the input image of the first pixel in the input pixel array.

4. The apparatus according to claim 3, wherein said calculation unit comprises:
an initial phase holding unit configured to hold the initial phase of a negative value as a difference containing a direction from the position in the input image of the first pixel in the input pixel array;
an accumulation unit configured to accumulate coefficients corresponding to the enlargement magnification and add the accumulated coefficients to the negative initial phase;
a detection unit configured to detect a change from a negative value to a positive value of a calculation and addition result value by said accumulation unit changes; and
an interpolation unit configured to perform interpolation using the pixel data of the virtual pixel arranged before the first pixel in the input pixel array and the pixel data of the first pixel in the input pixel array before detecting the change by said detection unit.

5. The apparatus according to claim 3, wherein said calculation unit comprises:
an initial phase holding unit configured to hold the initial phase of a positive value as a difference containing a direction from a position of the virtual pixel arranged before the first pixel in the input pixel array;
an accumulation unit configured to accumulate coefficients corresponding to the enlargement magnification and add the accumulated coefficients to the positive initial phase;
a decision unit configured to detect a first overflow in said accumulation unit; and
an interpolation unit configured to perform interpolation using the pixel data of the virtual pixel arranged before the first pixel in the input pixel array and the pixel data of the first pixel in the input pixel array before detecting the first overflow by said decision unit.

6. The apparatus according to claim 1, wherein the image enlargement apparatus uses said units defined in claim 1 independently in the horizontal and vertical directions to enlarge a two-dimensional image.

7. An image forming apparatus comprising an image enlargement apparatus according to claim 1.

8. A method of enlarging an input image by performing interpolation on input image data, comprising the steps of:
arranging virtual pixels, which are not included in the input image data, before a first pixel and after a last pixel in an input pixel array in at least one of horizontal and vertical directions of the input image to be enlarged;
determining a position in an output image of a first pixel in an output pixel array of output image data in accordance with an enlargement magnification so that a difference between a position in the input image of a first pixel in the input pixel array and a position in the output image of the first pixel in the output pixel array equals a difference between a position in the input image of a last pixel in the input pixel array and a position in the output image of a last pixel in the output pixel array; and
calculating pixel data of an output pixel at a position in the output image before the position in the input image of the first pixel in the input pixel array by performing interpolation based on pixel data of the virtual pixel arranged before the first pixel the input pixel array and pixel data of the first pixel in the input pixel array, and calculating pixel data of an output pixel at a position in the output image after the position in the input image of the last pixel in the input pixel array by performing interpolation based on pixel data of the virtual pixel arranged after the last pixel in the input pixel array and pixel data of the last pixel in the input pixel array.

9. A non-transitory computer-readable storage medium storing a program for causing a computer to execute steps of an image enlargement method according to claim 8.

* * * * *